(12) United States Patent
Merck et al.

(10) Patent No.: US 9,217,534 B2
(45) Date of Patent: Dec. 22, 2015

(54) BRACKET

(75) Inventors: Erik S. Merck, Sharon, MA (US); Ram Das S. Rao, Brighton, MA (US)

(73) Assignee: Ericsson Inc., Plano, TX (US)

( * ) Notice: Subject to any disclaimer, the term of this patent is extended or adjusted under 35 U.S.C. 154(b) by 361 days.

(21) Appl. No.: 13/820,339

(22) PCT Filed: Mar. 22, 2011

(86) PCT No.: PCT/US2011/029437
§ 371 (c)(1),
(2), (4) Date: Mar. 1, 2013

(87) PCT Pub. No.: WO2011/119613
PCT Pub. Date: Sep. 29, 2011

(65) Prior Publication Data
US 2013/0206944 A1    Aug. 15, 2013

Related U.S. Application Data

(60) Provisional application No. 61/316,220, filed on Mar. 22, 2010.

(51) Int. Cl.
*F16M 13/00* (2006.01)
*F16M 13/02* (2006.01)
*H01F 27/02* (2006.01)

(52) U.S. Cl.
CPC .............. *F16M 13/02* (2013.01); *H01F 27/02* (2013.01)

(58) Field of Classification Search
USPC .............. 248/222.41, 220.21, 220.22, 224.8, 248/225.11
See application file for complete search history.

(56) References Cited

U.S. PATENT DOCUMENTS

| | | | |
|---|---|---|---|
| 5,683,203 A | 11/1997 | Anderson et al. | |
| 5,738,020 A * | 4/1998 | Correia | 109/51 |
| 5,796,585 A | 8/1998 | Sugiyama et al. | |
| 6,486,399 B1 | 11/2002 | Armstrong et al. | |
| 6,799,743 B2 * | 10/2004 | Sawayanagi | 248/27.1 |
| 7,002,265 B2 | 2/2006 | Potega | |
| 2009/0173855 A1 * | 7/2009 | Worrall | 248/222.12 |
| 2009/0289158 A1 | 11/2009 | Nelson et al. | |
| 2011/0266404 A1 * | 11/2011 | Hsu et al. | 248/222.14 |
| 2012/0119046 A1 * | 5/2012 | Hsu et al. | 248/222.14 |
| 2013/0020452 A1 * | 1/2013 | Yu et al. | 248/220.21 |

OTHER PUBLICATIONS

International Search Report and Written Opinion dated May 20, 2011 corresponding to patent application No. PCT/US11/029437. 10 pages.

\* cited by examiner

*Primary Examiner* — Steven Marsh

(57) ABSTRACT

A bracket is provided that includes a plurality of apertures for mounting the bracket to a variety surfaces and connecting equipment selected by a user. The bracket may include an adjustable supporting arm and a connection box for providing a secure area for input and output devices to the equipment. The bracket may have a configuration that facilitates its mounting on a telephone or utility pole.

10 Claims, 28 Drawing Sheets

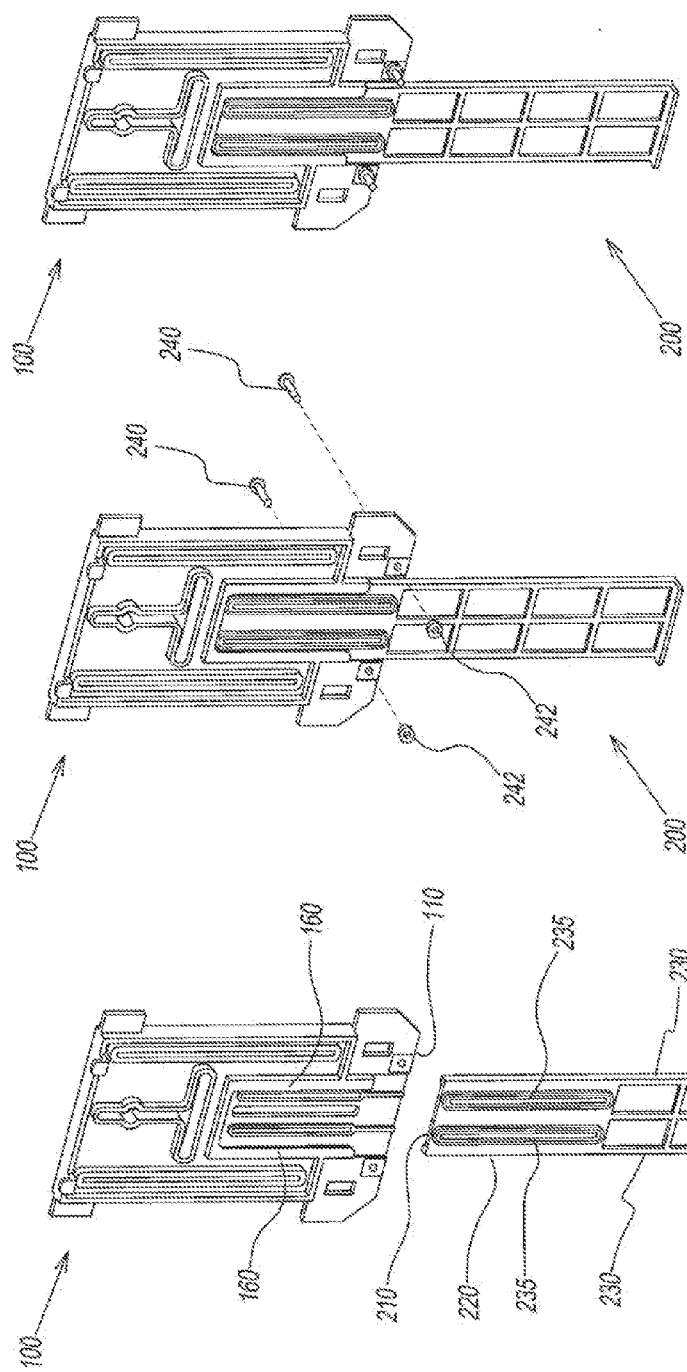

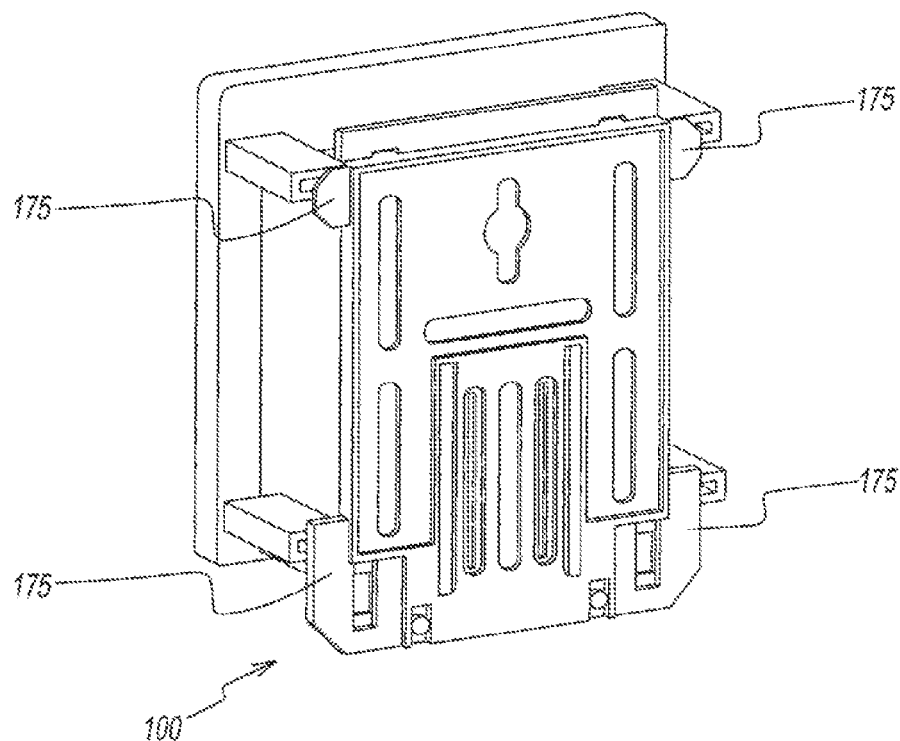
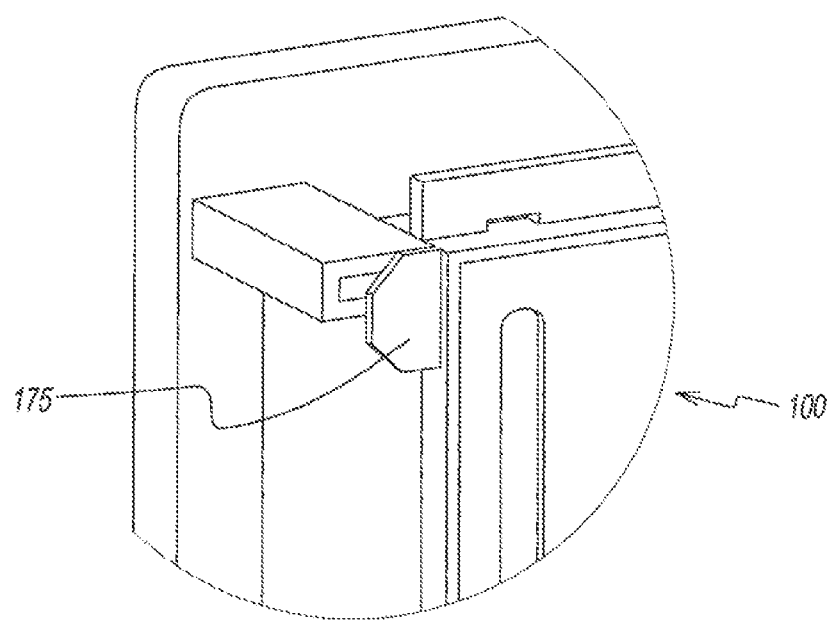
FIG. 18

BRACKET

BACKGROUND

1. Field of the Disclosure

The present disclosure relates to a bracket. More specifically, the present disclosure relates to a bracket that is mounted to a surface, such as a pad-type transformer or a telephone/utility pole, to hold equipment in place.

2. Description of Related Art

In the field of electronics and communications, there is often essential equipment that must be mounted in areas above and below the ground, such as telephone/utility poles, transformer type structures or within tunnel like formations. Various types of supports or platforms have been developed to mount equipment onto these surfaces. However, traditional mounting devices, often fail to allow the use of the same device for a variety of surfaces and locations.

Furthermore, these mounting devices are often made of numerous parts and expensive materials, thus becoming costly and difficult for a user to carry and install. In addition, the mounting devices fail to provide security features to protect the connected equipment from removal or tampering of any kind by unauthorized persons.

Accordingly, there is a need for a mounting bracket that can be used to easily connect equipment onto a variety of surfaces, yet be inexpensive and lightweight for the user. Furthermore, there is a need for a bracket having safety features to prevent access to the equipment by an unauthorized person.

SUMMARY OF THE DISCLOSURE

The present disclosure provides for a bracket that allows a user to easily and securely connect equipment, such as a grid node, to a transformer or a telephone/utility pole.

The present disclosure also provides for a bracket that comprises a plurality of apertures for mounting to a variety of surfaces.

The present disclosure preferably provides that a connection box can be connected to the bracket. The connection box provides a secure area for connecting input and output devices to the equipment connected to the bracket. Preferably, the connection box has a locking means, such as a pad lock, to prevent access by an unauthorized person.

The present disclosure further provides, in a first exemplary embodiment, a supporting arm that can be slidably connected to ridges on the bracket. The supporting arm is preferably used when mounting the bracket to a pad-type transformer. The present disclosure still further provides that the height of the supporting arm can be adjusted to allow a foot of the supporting member to sit flush to the pad or ground, thereby providing the bracket with additional support.

The present disclosure further provides a second exemplary embodiment in which the bracket has a selected configuration so that it can be readily mounted in a spaced away relationship to a telephone/utility pole.

The present disclosure still further provides for an adapter.

BRIEF DESCRIPTION OF THE DRAWINGS

Other and further benefits, advantages and features of the present invention will be understood by reference to the following specification in conjunction with the accompanying drawings, in which like reference characters denote like elements of structure and:

FIGS. 9a-9c are perspective views of the support member of FIG. 7 at different extended positions.

FIG. 18 is a rear perspective view of a bracket of the present disclosure with equipment being connected.

DETAILED DESCRIPTION OF THE DISCLOSURE

Figure 1:
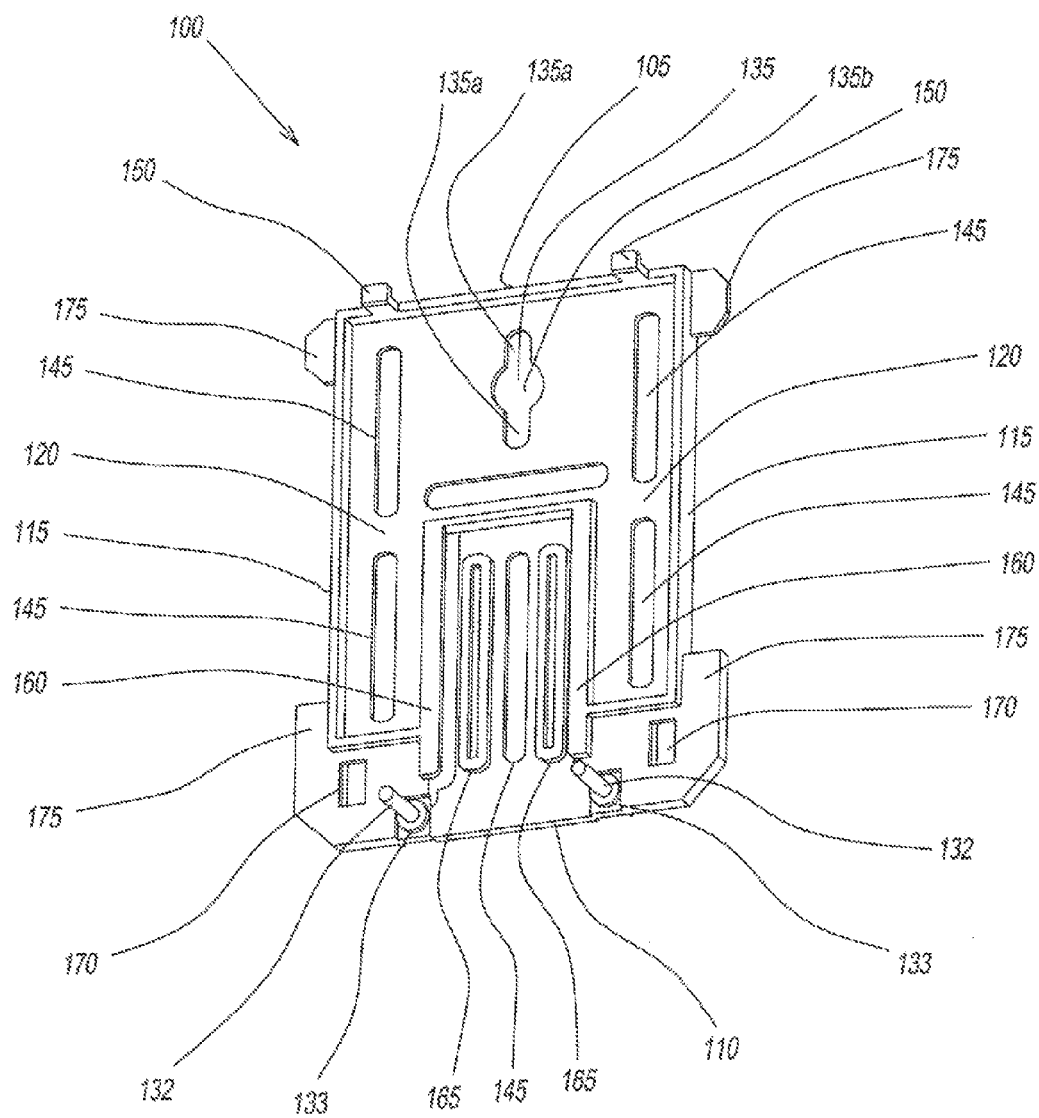
FIG. 1 is a front perspective view of a bracket of a first exemplary embodiment of the present disclosure.
Figure 2:
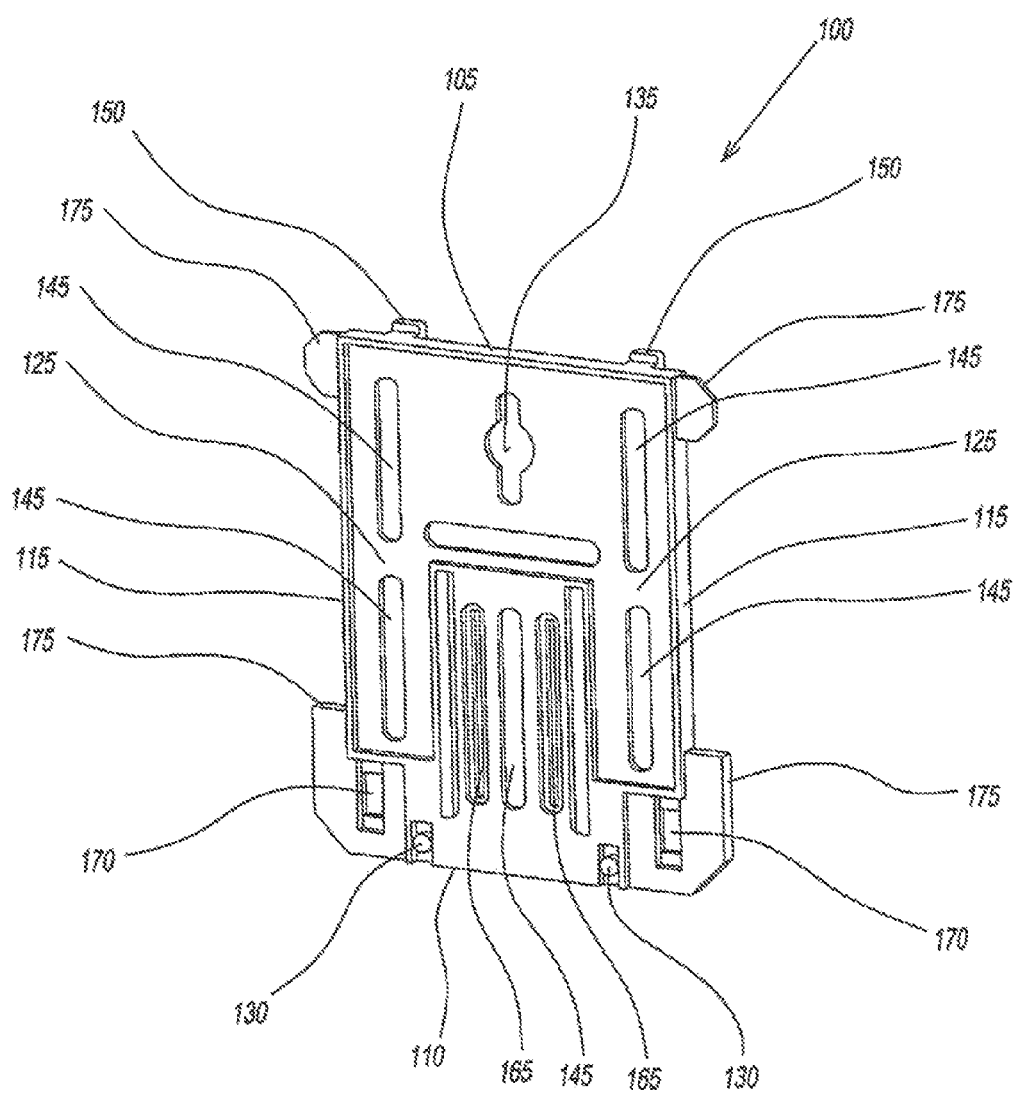
FIG. 2 is a rear perspective view of the bracket of FIG. 1.

Referring to the drawings, and in particular FIG. 1, there is provided a bracket according to a first embodiment of the present disclosure that is shown and generally referred to by reference numeral 100. As shown in FIGS. 1 and 2, bracket 100 includes a first end 105, a second end 110 and a pair of side edges 115. Furthermore, bracket 100 has a front side 120 and a rear side 125.

Bracket 100 can be mounted onto a surface and thereafter a user's equipment can be securely connected thereon. While bracket 100 can be secured to any type of surface desired by a user, for example, a surface that is below ground, above the ground or on the ground, including but not limited to, a telephone or utility pole, a building, a wall, a ceiling or overhang, a transformer, a transformer-type structure, within a tunnel or enclosure or any other vertical or horizontal surface desired by the user, preferably, bracket 100 is mounted onto a transformer or transformer-type structure.

Bracket 100 can be made of any durable material such as, metal, plastic, or wood or other similar material. Preferably, bracket 100 is made of a thermoplastic material, such as polycarbonate. Use of a thermoplastic material provides bracket 100 with a strong, environmental, durable and long-lasting quality, while having a lightweight feel for the user. Furthermore, use of a thermoplastic material provides lower cost for the user as compared with other materials. Bracket 100 can be formed by a variety of processes depending on the type of material used. Preferably, bracket 100 is formed by injection molding. Bracket 100 can be formed by other processes, such as, but not limited to, compression molding, extrusion molding/forming, sheet metal stamping/forming, plastic casting and metal casting.

Bracket 100 can be made to have any dimension required for connecting to a user's equipment. Preferably, bracket 100 has a height, between the outmost edges of first end 105 to second end 110, between about 5 inches to 20 inches. More preferably, bracket 100 has a height of about 14 inches. Preferably, the width of bracket 100, between the pair of side edges 115, is between about 5 inches to 15 inches. More preferably, the bracket 100 has a width of 11 inches. Bracket 100 as a depth of about 1 inch.

Bracket 100 can have any number of apertures and/or slots for receiving a variety of fasteners. The apertures can have any shape, such as, round, oval, keyhole, square, rectangle or any other suitable geometry or shape. The fasteners can include, but are not limited to, bolts, screws, nails, tacks, pins, and straps.

Bracket 100 has at least one mounting aperture 135 for installing bracket 100 to a surface. As shown in FIGS. 1 and 2, it is preferred that mounting aperture 135 is in the center of first end 105. It is also preferred that mounting aperture 135 has a keyhole shape positioned in a vertical orientation to receive a fastener inserted by a user or a fastener that already exists on a surface. Mounting aperture 135 has narrower portions 135*a* and wider portion 135*b*.

Bracket 100 may also have at least one securing aperture 130 for connecting a user's equipment to bracket 100 once the bracket is mounted to a surface. Preferably, bracket 100 has a pair of securing apertures 130 on second end 110, as shown in FIG. 2. It is more preferable, that securing apertures 130 are on oppositely disposed sides of second end 110. Securing apertures 130 are of sufficient size to receive a fastener, such as a securing fastener 132, as shown in FIG. 1. Securing fasteners 132 are placed into securing apertures 130 through rear side 125 of bracket 100 prior to mounting bracket 100 to a surface. Once in place, the head of securing fastener 132 should be flush or countersunk below with rear side 125. A mating fastener 133, such as a washer, retaining washer, nut or similar fastener, is placed onto the portion of securing fastener 132 protruding from front side 120 of bracket 100, as shown in FIG. 1. Mating fasteners 133 hold securing fasteners 132 to bracket 100.

Figure 3:
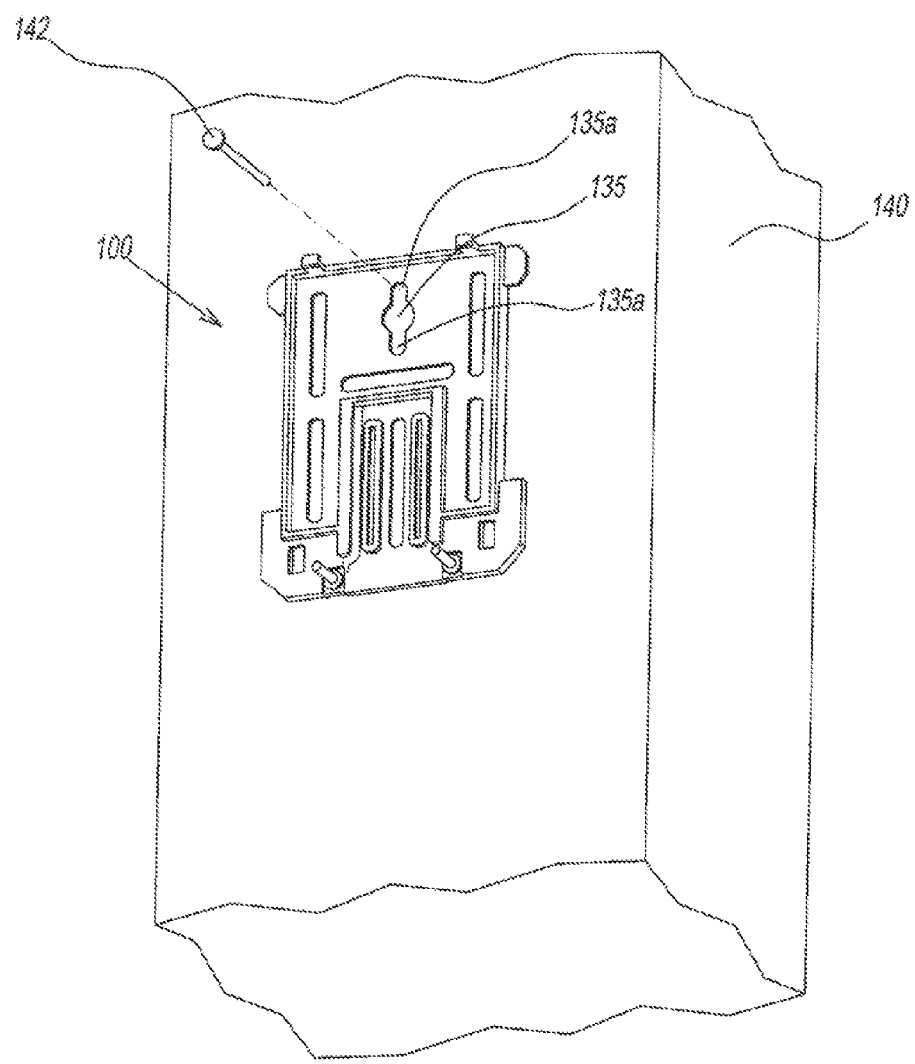
FIG. 3 is a perspective view of the bracket FIG. 1 being mounted onto a surface.
Figure 4:
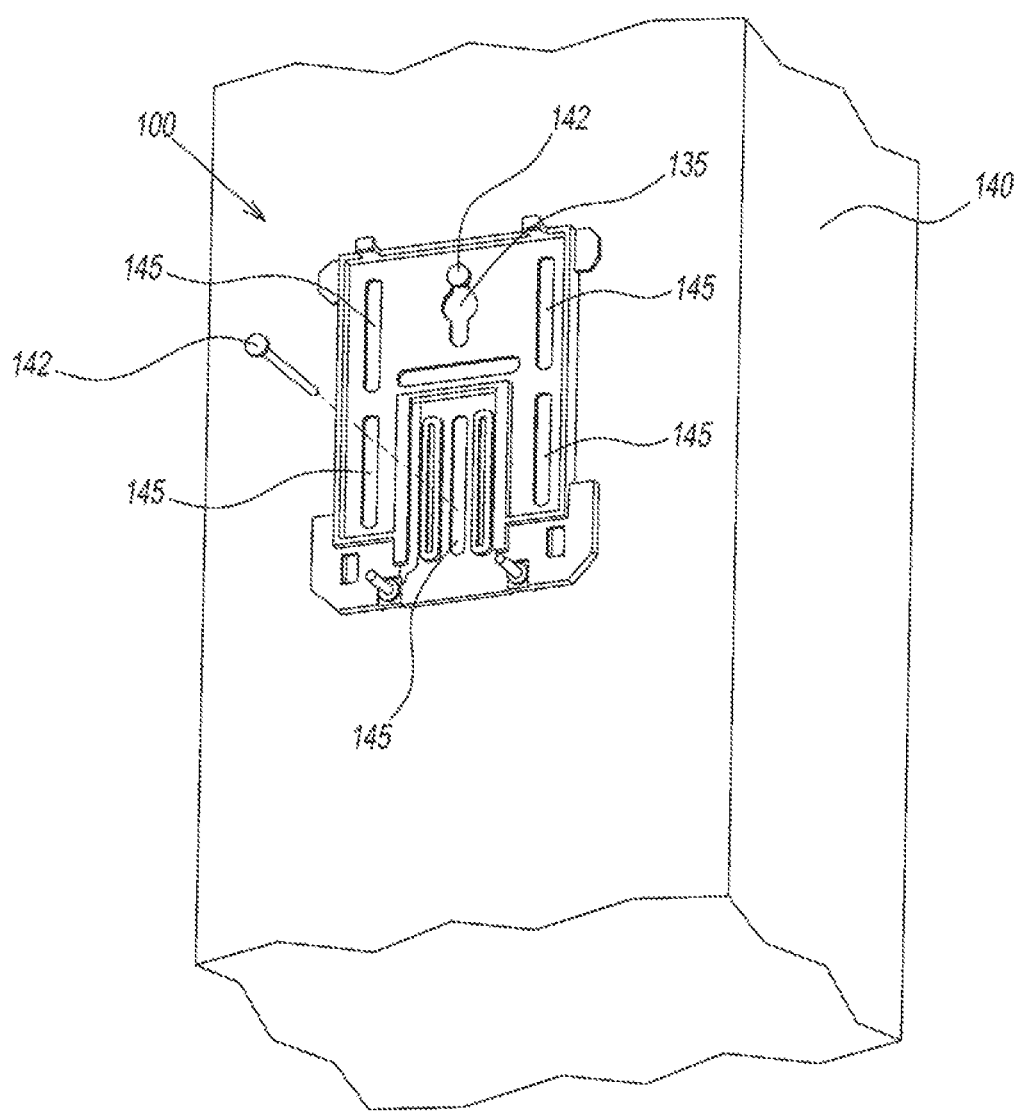
FIG. 4 is another perspective view of the bracket of FIG. 1 being mounted onto a surface.

To mount bracket 100, rear side 125 of bracket 100 is placed flush against a surface, such as surface 140, selected by the user, as shown in FIG. 3. A mounting fastener 142 is positioned in the narrow portions 135*a* of mounting aperture 135 and inserted into surface 140 to secure bracket 100, as shown in FIGS. 3 and 4. The preferred keyhole shape of mounting aperture 135 allows a user to adjust the height of bracket 100 to achieve a proper vertical position before fully inserting mounting fastener 142 into surface 140.

Furthermore, the keyhole shape allows bracket 100 to be mounted onto an existing fastener on a surface. Thus, the round portion of mounting aperture 135 should be of sufficient size to receive the head of an existing fastener. Thereafter, bracket 100 is adjusted to the correct vertical height and the fastener is fully secured by the user.

Bracket 100 may also have a mounting slot 145 to receive additional mounting fasteners 142. As shown in FIGS. 1, 2 and 4, it is preferred that bracket 100 has a plurality of mounting slots 145 configured in any orientation, such as, horizontal, vertical, diagonal or other orientation.

As shown in FIG. 4, a user may insert a mounting fastener 142 into any slot 145 to secure bracket 100 to surface 140, as needed. Mounting fastener 142 can be any fastener described herein. Mounting slots 145 allow the user to adjust bracket 100 in the mounting slot before fully securing mounting fastener 142. This allows bracket 100 to be secured in a properly aligned position.

Once bracket 100 is properly mounted to a surface, a user may connect equipment to bracket 100. To connect equipment, bracket 100 may have at least one connecting means, such as a tab or fasteners, such as securing fasteners 132. As shown in FIG. 1, bracket 100 may have at least one tab 150 disposed on bracket 100. Preferably, bracket 100 has a pair of tabs 150 oppositely disposed on first end 105 of bracket 100, as shown in FIGS. 1 and 2.

Figure 5:
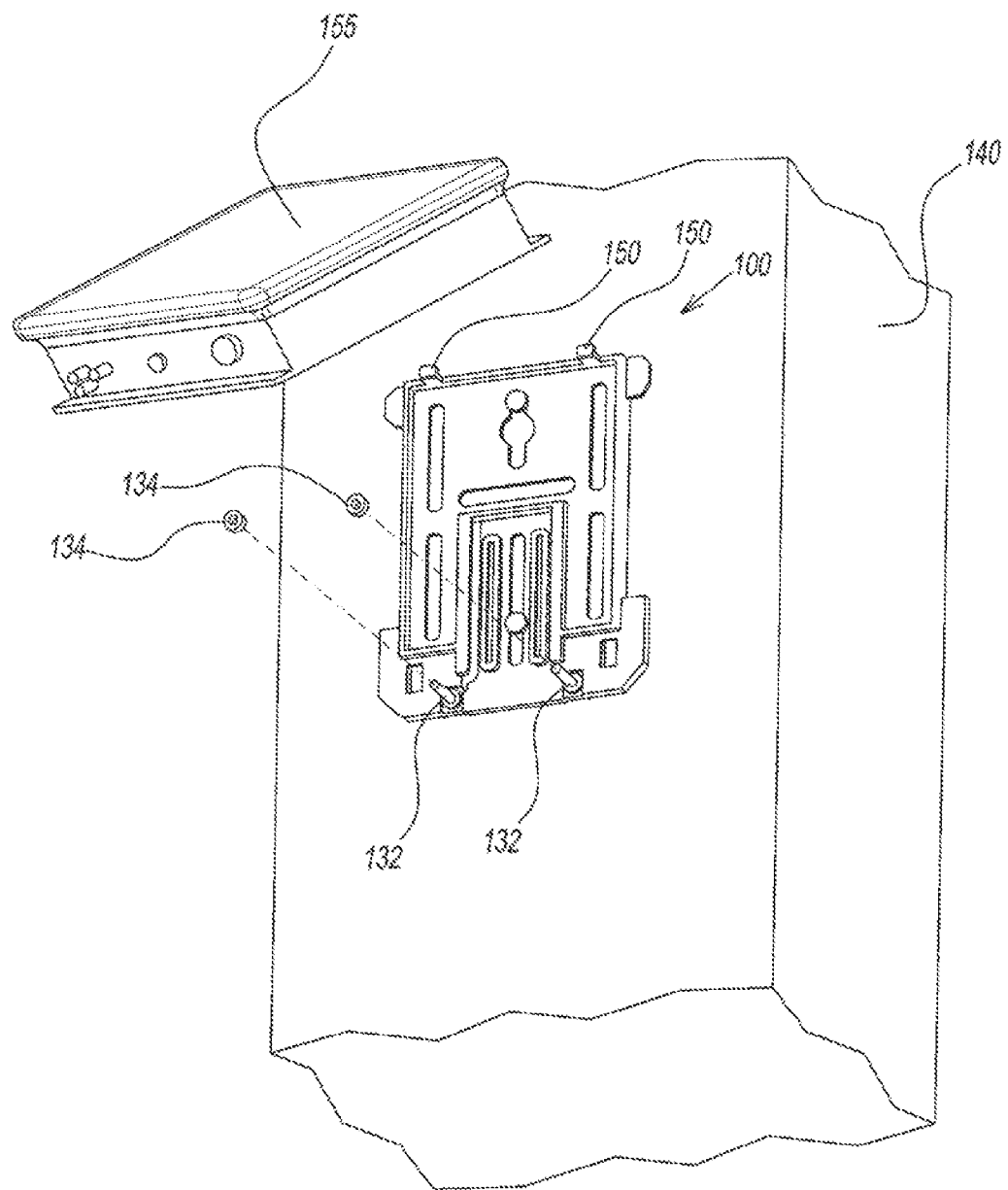
FIG. 5 is a perspective view of the bracket FIG. 1 with equipment being connected.
Figure 6:
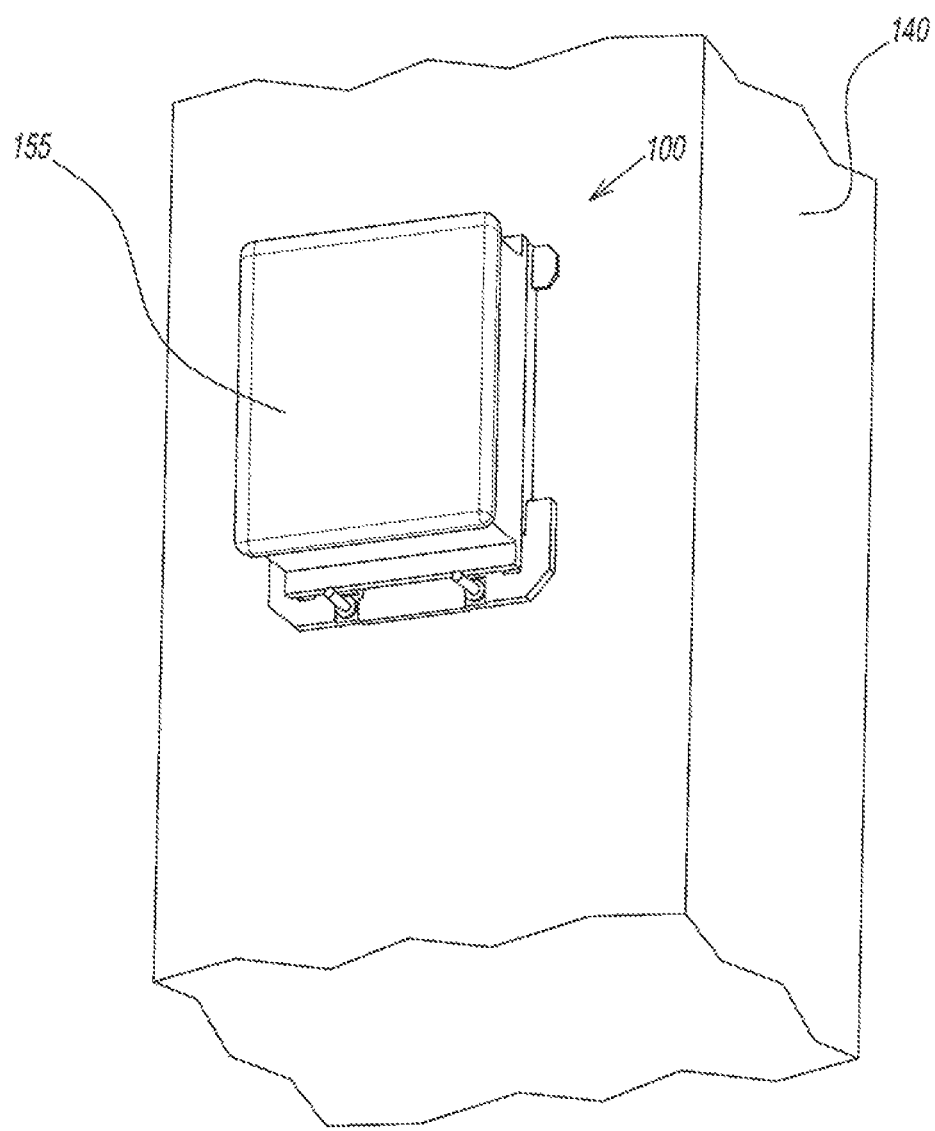
FIG. 6 is a perspective view of a mounted bracket of the present disclosure with equipment connected to the bracket.
Figure 24:
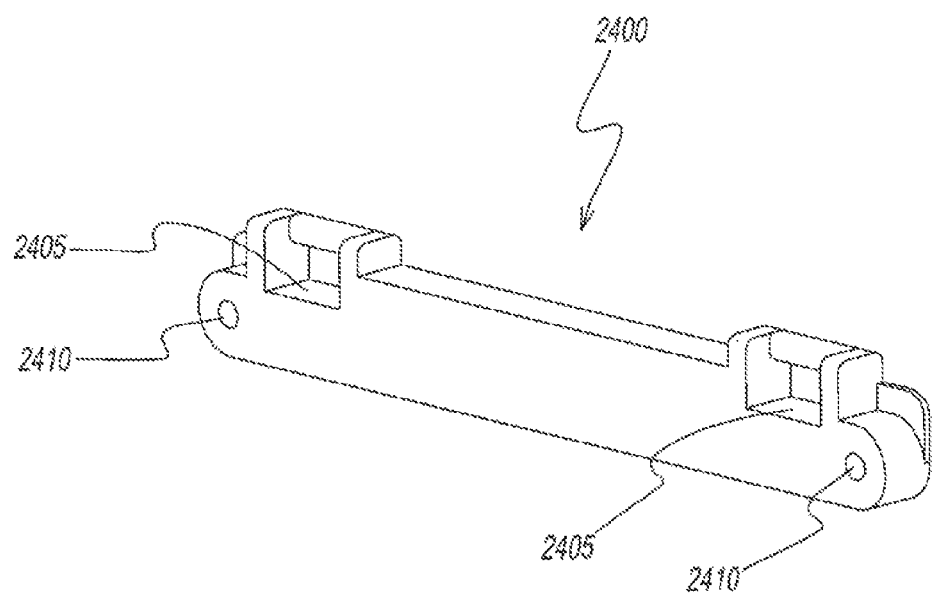
FIG. 24 is a perspective view of a top adapter of the present disclosure connectable to the bracket of FIG. 1 and the bracket of FIG. 19.
Figure 26:
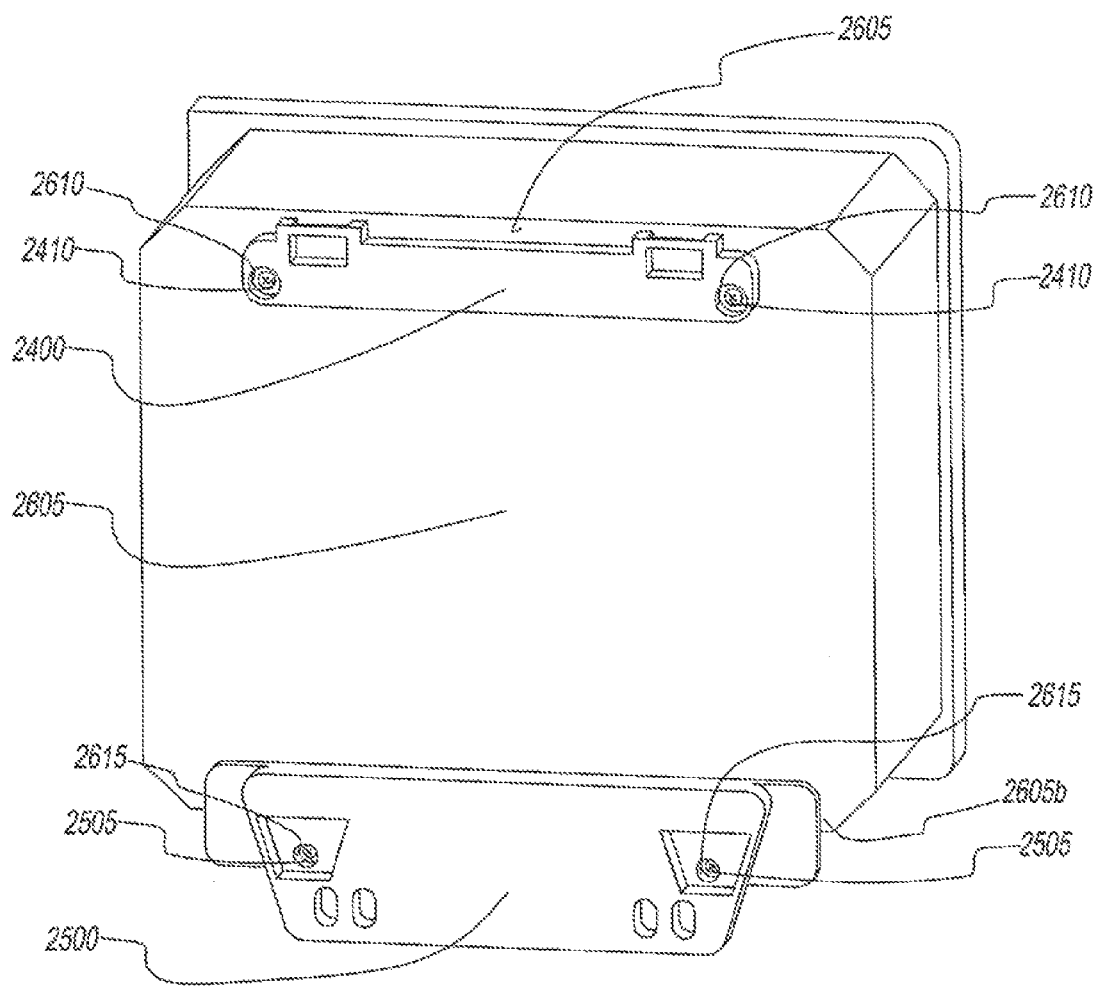
FIG. 26 is perspective view of the top adapter of FIG. 24 and the bottom adapter of FIG. 25 connected to equipment.

The equipment that a user connects to bracket 100 should have openings and/or recesses corresponding to tab 150 and/or securing fasteners 132, that may be protruding from bracket 100. As shown in FIGS. 5, 24 and 26, the openings and/or recesses of equipment, such as equipment 155, are lined up with tabs 150 and securing fasteners 132. Once properly connected, a retainer or retaining means 134, such as nuts or clip pins are placed on securing fasteners 132 to connect equipment 155 to bracket 100. FIG. 6 shows equipment 155 properly connected to bracket 100 that is mounted on a surface 140.

As shown in FIG. 1, bracket 100 may have a pair of ridges 160 protruding from front surface 120 of bracket 100. Ridges 160 are preferably in a vertical orientation, running parallel with sides 115. Furthermore, bracket 100 may have any number of support slots 165 to receive fasteners in between ridges 160. Preferably, bracket 100 has a pair of support slots 165.

As shown in FIGS. 1 and 2, bracket 100 may also have at least one connection box aperture 170. Preferably, bracket 100 has a pair of connection box apertures 170 on second end 110 that are positioned on oppositely disposed sides of bracket 100. Connection box apertures 170 can be any size; however it is preferred that connection box apertures 170 are rectangle or square in size. Furthermore, bracket 100 may have at least one flange 175 protruding from bracket 100. Preferably, bracket 100 has four flanges 175 oppositely disposed along sides 115.

In another exemplary embodiment, bracket 100 may have a support member 200 connected thereto. Support member 200 is used in conjunction with bracket 100 when bracket 100 is mounted on a surface where additional support may be desired. Furthermore, support member 200 prevents the rotation of bracket 100 once mounted to a surface. For example, support member 200 is preferably used when bracket 100 is mounted to a pad-type transformer so prevent rotation or shifting of the bracket on the surface of the transformer.

Figure 7:
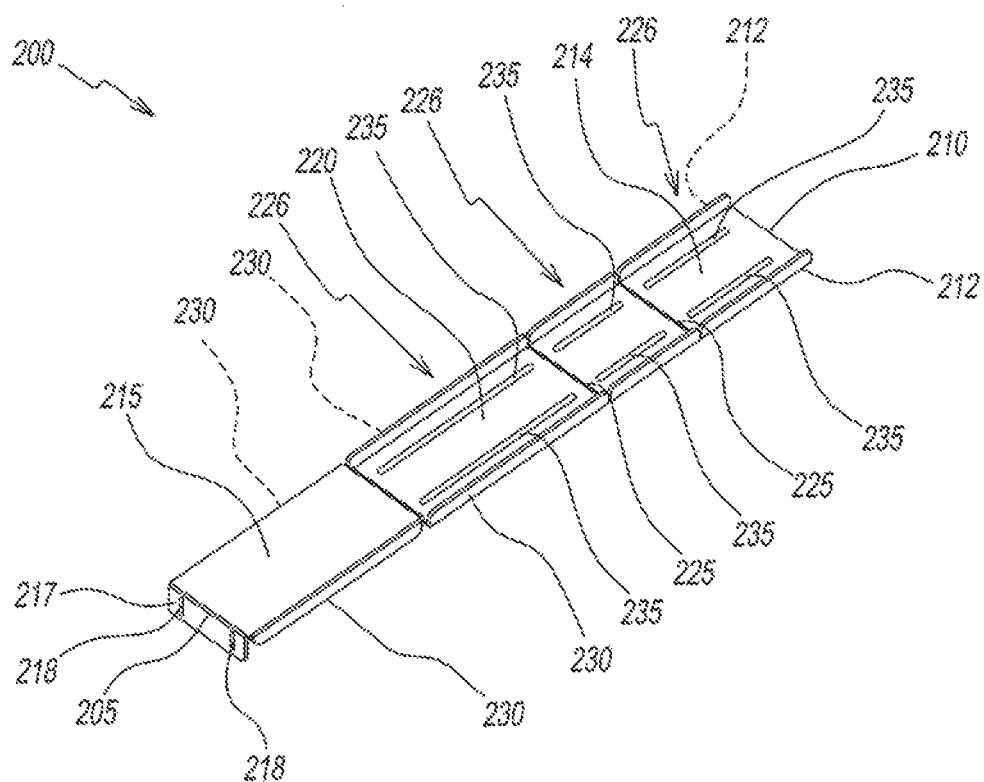
FIG. 7 is a rear perspective view of a support member of the bracket of FIG. 1 of the present disclosure.
Figure 8:
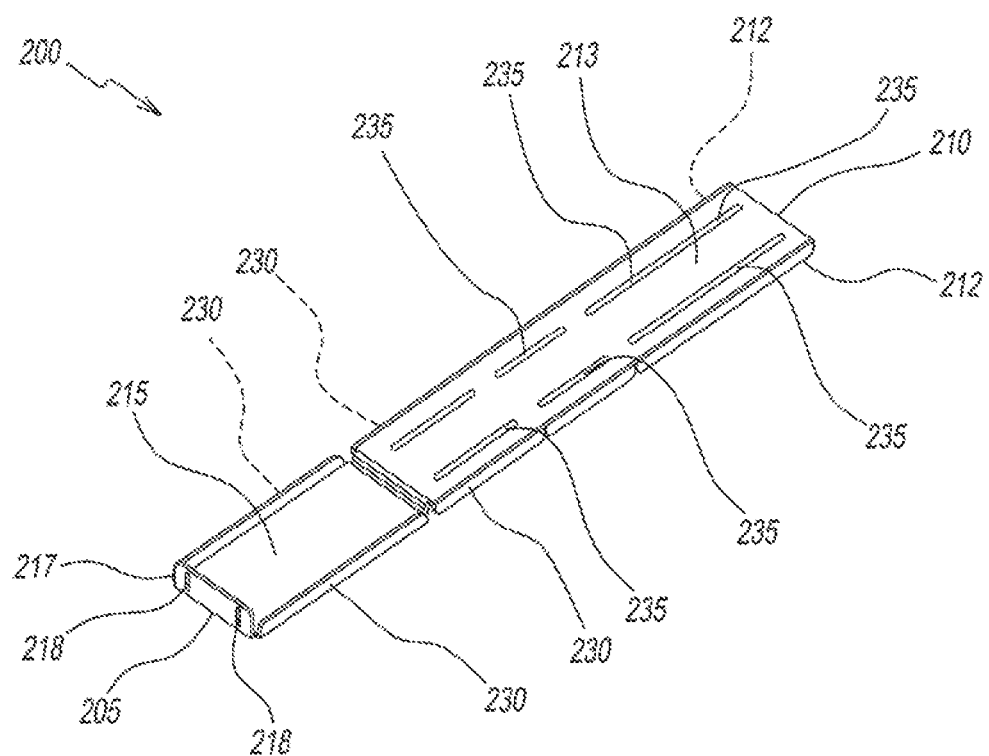
FIG. 8 is a front perspective view of the support member of FIG. 7.

Support member 200 can be made from any of the same materials described for bracket 100. Support member 200 has a bottom end 205, a top end 210 and a pair of sides 212, as shown in FIGS. 7 and 8. Furthermore, support member 200 has a front surface 213, as shown in FIG. 8, and rear surface 214, as shown in FIG. 7.

Support member 200 has a bottom segment 215 at bottom end 205 that is connected to an arm segment 220, as shown in FIGS. 7 and 8. As shown in FIG. 7, arm segment 220 may have at least one groove 225 on rear surface 214 to separate the arm segment into any number of sections 226. It is preferred that arm segment 220 has between one and five segments 226. More preferably, arm segment 220 has three sections 226, as shown in FIG. 7.

Grooves 225 allow a user to bend arm segment 220 at the grooves and break off sections 226 to obtain a length of support member 200 desired by the user. The connection between bottom segment 215 and arm segment 220 may be fixed or have a groove 225 to allow bending. Bottom segment 215 may further have a foot 217 with at least one foot aperture 218 that will receive at least one bottom fastener 219, as shown in FIGS. 7 and 8.

Furthermore, bottom segment 215 and arm segment 220 have a pair of oppositely disposed ribs 230. This provides additional strength along sides 212 of supporting member 200 and acts as a guide when connecting supporting member to bracket 100, as shown in FIG. 7. Arm segment 220 may also have an arm slot 235 to receive a fastener. Preferably, arm segment 220 has a pair arm slots 235 on each section 226, as shown in FIG. 7.

To connect support member 200 to bracket 100, arm segment 220 at the top end 210 of support member 200 is lined up to ridges 160 at bottom end 110 of bracket 100, as shown in FIG. 9a. Ribs 230 on arm segment 220 allow securing member 220 to be slidably connected to ridges 160 of bracket 100, as shown in FIGS. 9b and 9c.

Once support member 200 is fully engaged with bracket 100, an arm fastener 240 is inserted through the rear surface 125 of bracket 100. More specifically, arm fasteners 240 are inserted through support slots 165 of bracket 100 and arm slots 235 of support member 200, as shown in FIG. 9b. A securing means 242, such as nuts are placed on arm fasteners 240 to secure support member 200 to bracket 100. FIG. 9c shows a support member 200 properly connected to bracket 100.

Figures 10A, 10B:
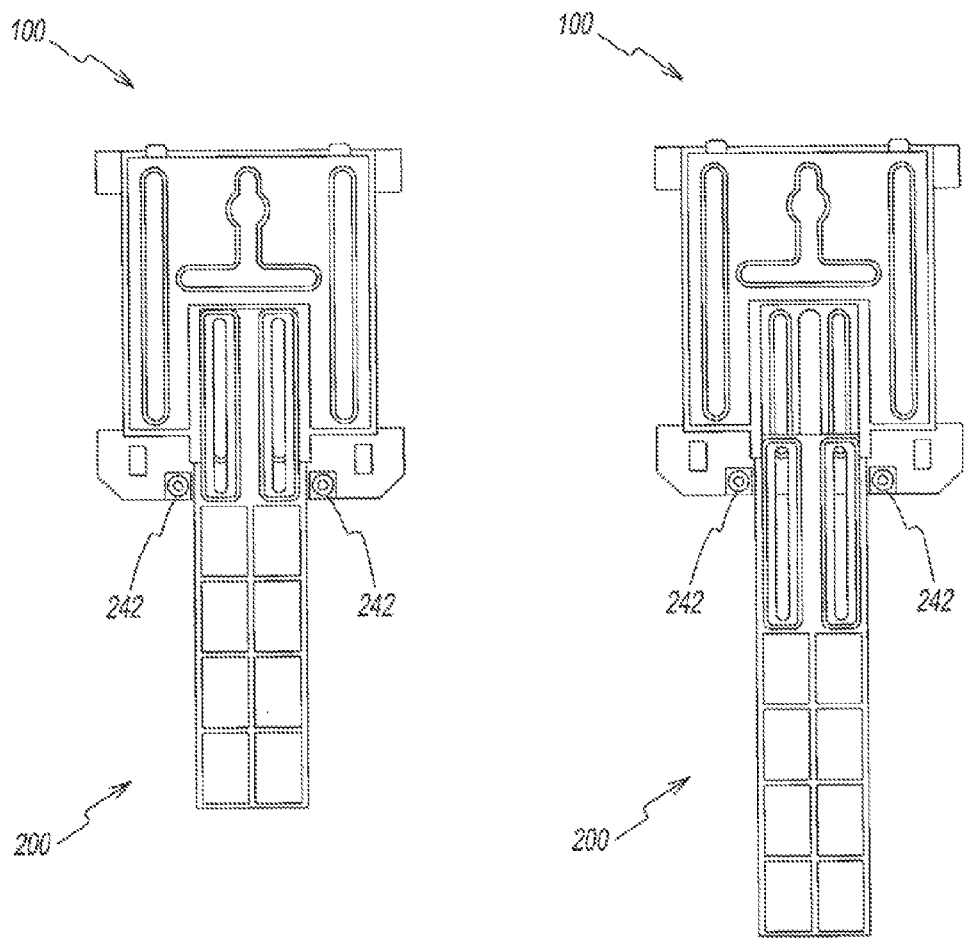
FIGS. 10a and 10b are front views of the support member and the bracket of FIG. 9 with the support member shown in a fully retracted position and a fully extended position.

In order to adjust the height of support member 200, securing means 242 are not fully tightened. This allows a user to slidably adjust the height of support member 200 to an appropriate position. FIG. 10a shows support member 200 in a fully retracted position and FIG. 10b shows support member 200 in a fully extended position. Support member 200 can be adjusted between 5 to 40 inches.

Figure 11:
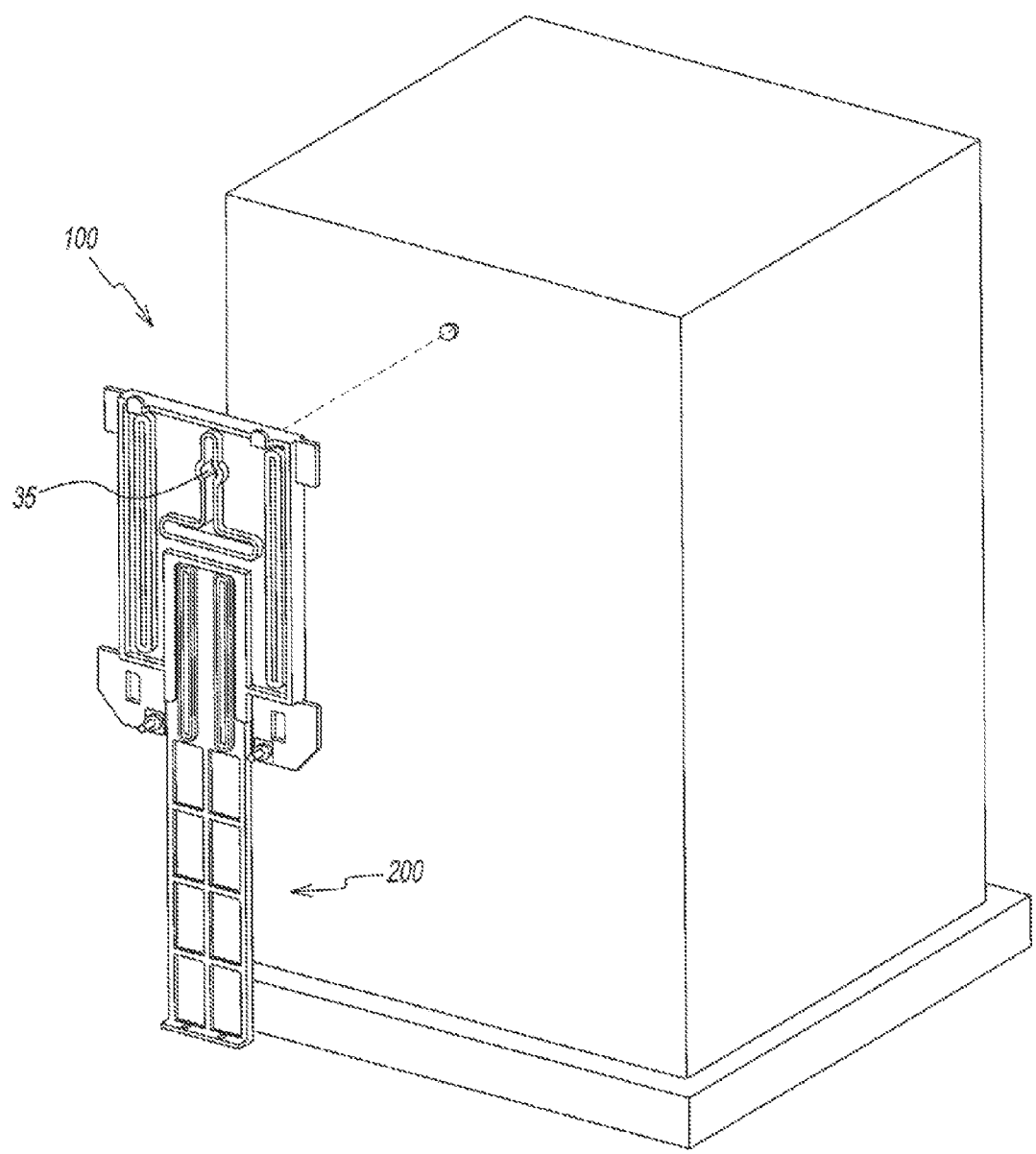
FIG. 11 is a perspective view of the support member and the bracket of FIG. 9 mounted to pad-type transformer.

The level of adjustment to support member 200 is determined when bracket 100 is mounted onto a surface such as a pad-type transformer, shown in FIG. 11. Bracket 100 is connected to a surface via mounting aperture 135, as previously described, by a fastening means inserted by the user or an existing fastening means on a surface, as shown in FIGS. 11 and 12.

Figure 12:
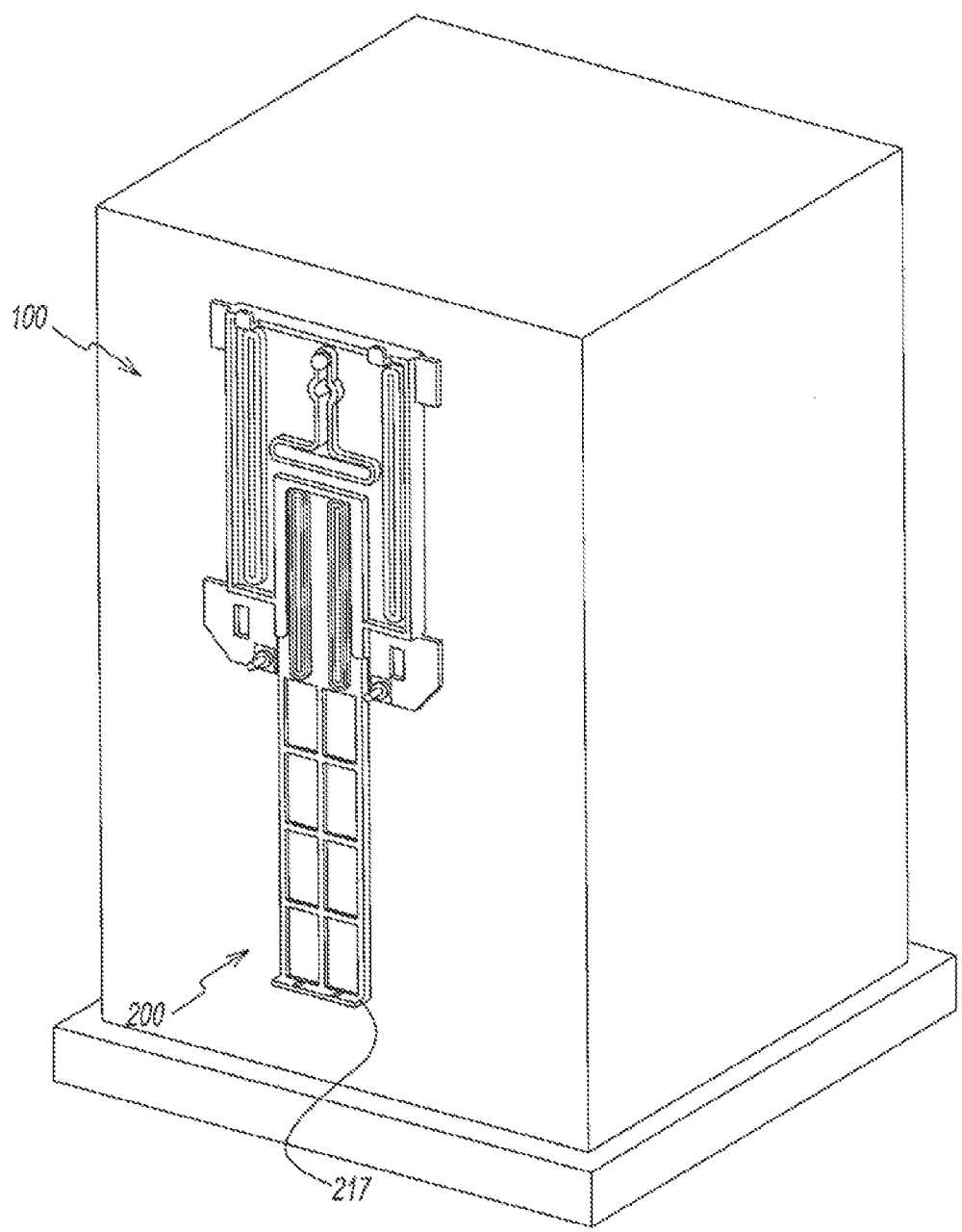
FIG. 12 is a perspective view of the support member and the bracket of FIG. 9 mounted to a pad-type transformer in a fully retracted position.
Figure 13:
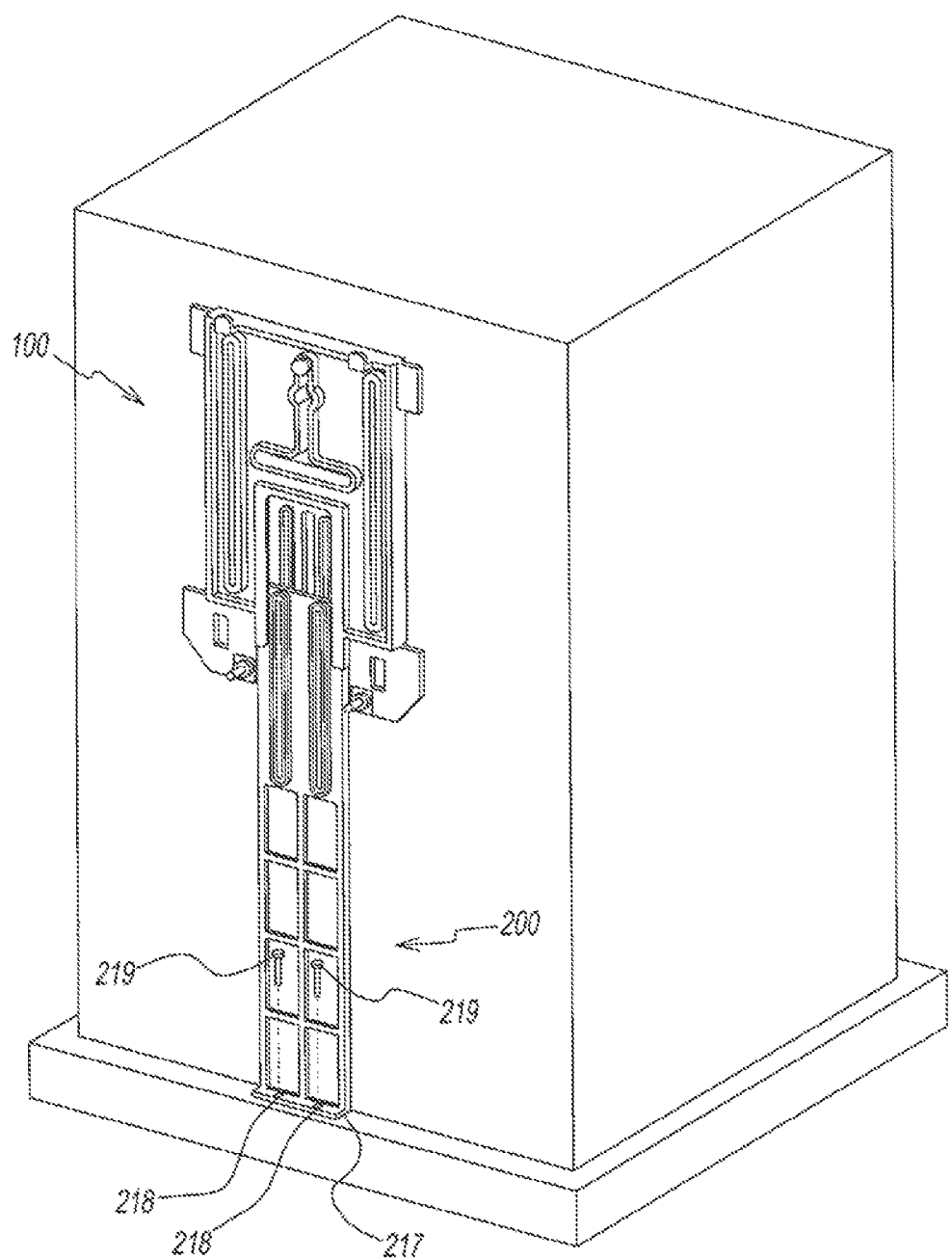
FIG. 13 is a perspective view of the support member and the bracket of FIG. 9 mounted to a pad-type transformer in an fully extended position.

Once bracket 100 is mounted to the surface, support member 200 can be adjusted by the user to position foot 217 flush on the ground or other flat surface, such as a pad shown in FIG. 12. Once an appropriate position is selected, securing means 242 are tightened to lock support member 200 in place on bracket 100. In addition, base fasteners 219 are inserted and into foot slots 218 to secure support member 200 to the ground or other flat surface, as shown in FIG. 13. Equipment may now be connected to bracket 100 by a user.

Figure 14:
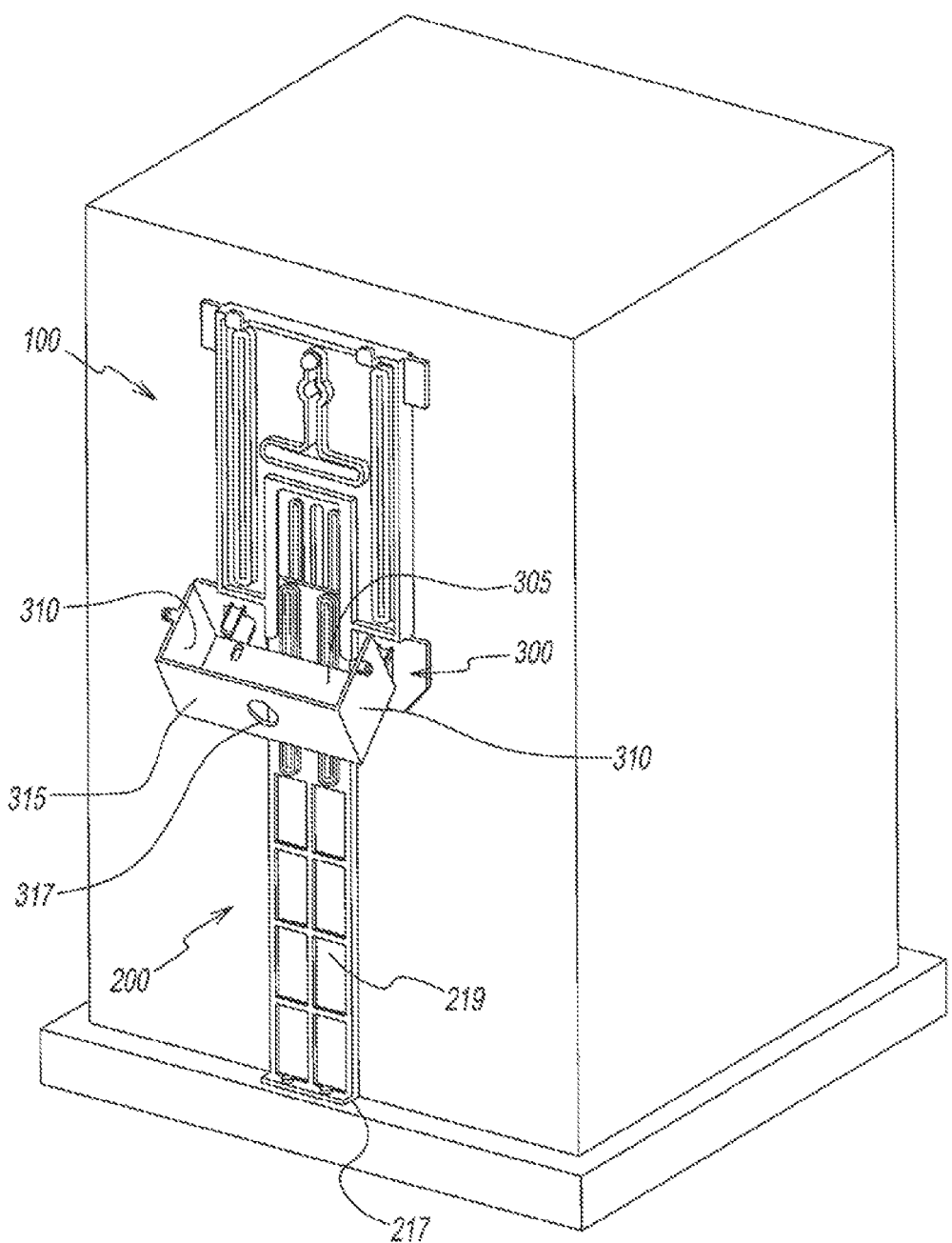
FIG. 14 is a perspective view of the support member, and the bracket of FIG. 9 and a connection box of the present disclosure as mounted to a pad-type transformer.

In another exemplary embodiment, a user may connect a security feature prior to connecting equipment to bracket 100, such as a connection box 300. As shown in FIG. 14, connection box 300 may have a plurality of walls, such as, but not limited to, a back 305, a pair of side walls 310 and a floor 315. Floor 315 may contain a floor opening 317, as shown in FIG. 14.

Figure 14A:
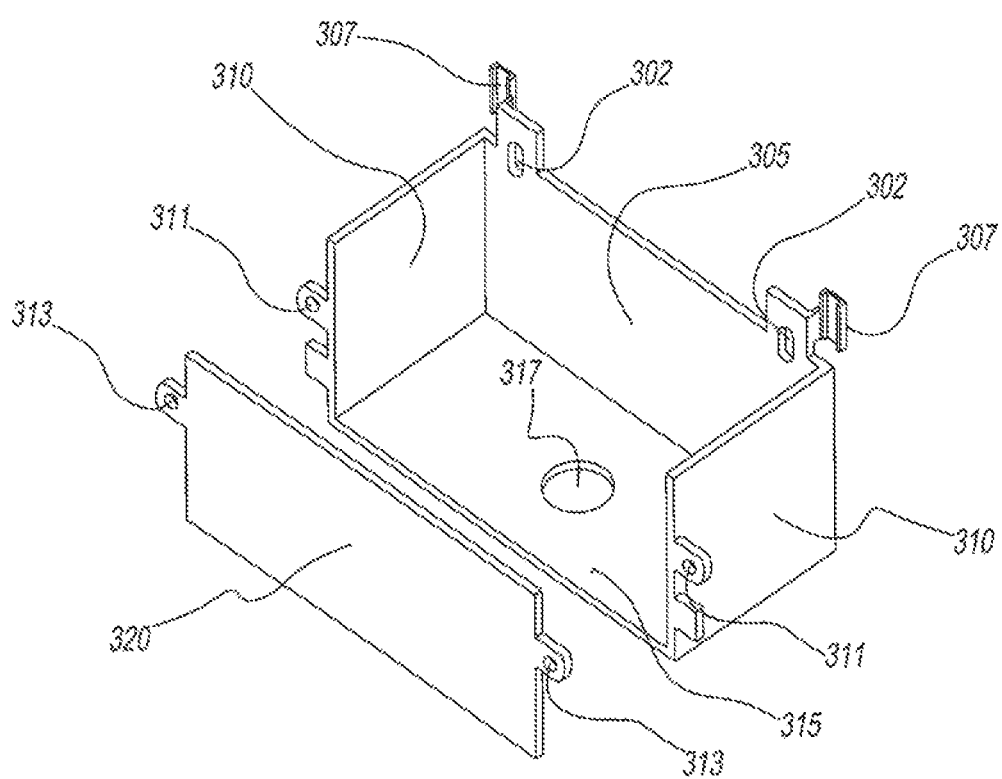
FIG. 14a an exploded perspective view of the connection box of FIG. 14 and a cover.
Figure 15:
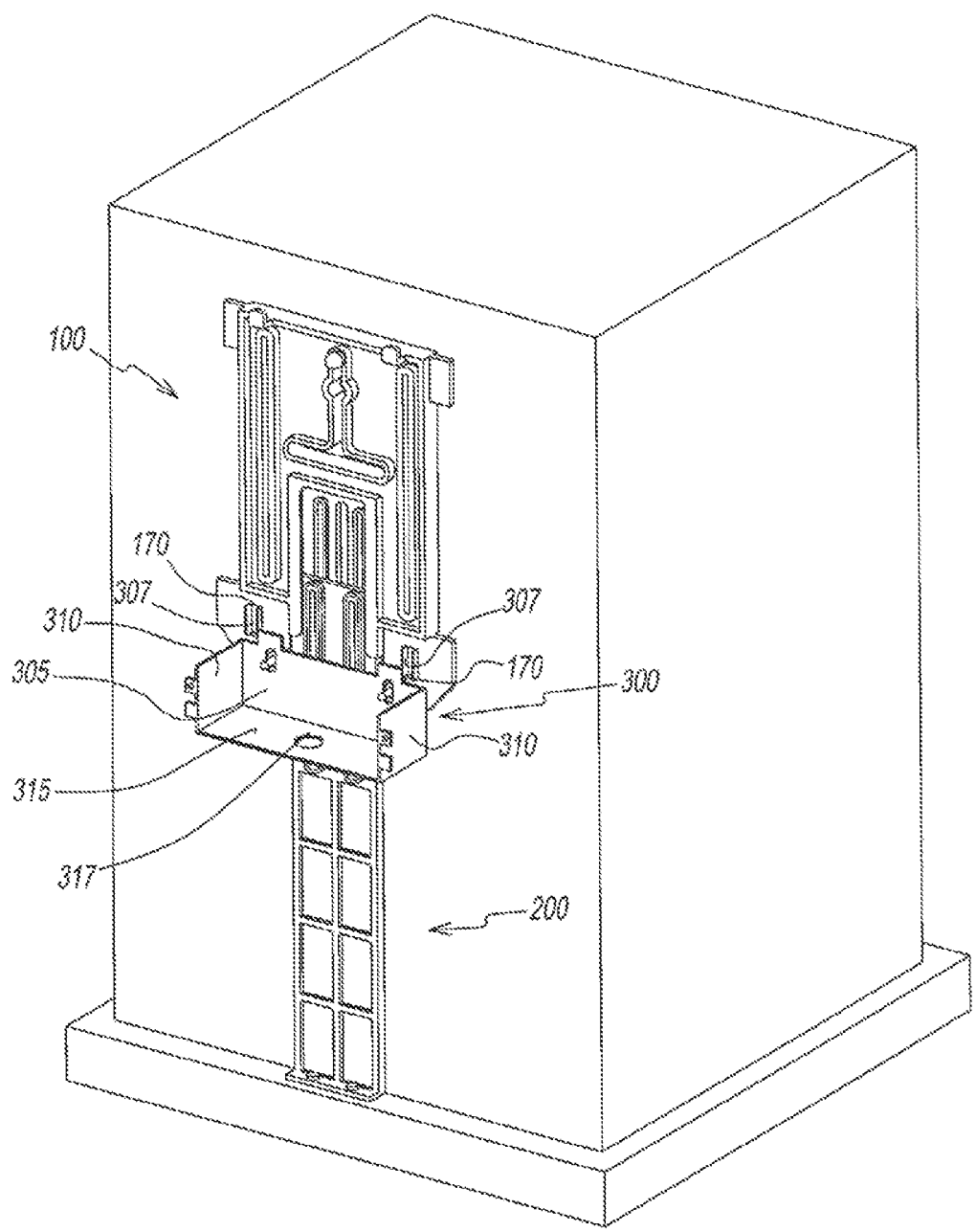
FIG. 15 is a perspective view of the support member, bracket and connection box of FIG. 14 mounted to a pad-type transformer.

Back 305 of connection box 300 may have at least one connection box tab 307 that corresponds with connection box apertures 170 on bracket 100. Preferably, back 305 has a pair of connection box tabs 307, as shown in FIGS. 14A and 15. To connect connection box 300 to bracket 100, connection box 300 is aligned at about a 45 degree angle to bracket 100 and connection box tabs 307 are inserted through connection box apertures 170, as shown in FIG. 14. Preferably, connection box 300 is secured by positioning connection box tabs 307 behind connection box apertures 170. Back 305 of connection box 300 is then lowered to sit parallel to bracket 100, as shown in FIG. 15. As shown in FIG. 14A, connection box 300 has fastener holes 302. Fastener holes 302 fit over securing fasteners 132 of bracket 100 so that securing fasteners 132 are inserted through fastener holes 302 when back 305 of connection box 300 is then lowered to sit parallel to bracket 100, and, retaining means 134 are then placed on securing fasteners 132 to connect connection box 300 to bracket 100, as shown in FIG. 15. Fastener holes 302 may be sized so that connection box 300 can be moved, for example, upwards or downwards, to a desired position on bracket 100. Once in the desired position, retaining means 134 can be tightly secured to securing fasteners 132 to maintain connection box 300 in the desired position on bracket 100.

Figure 16:
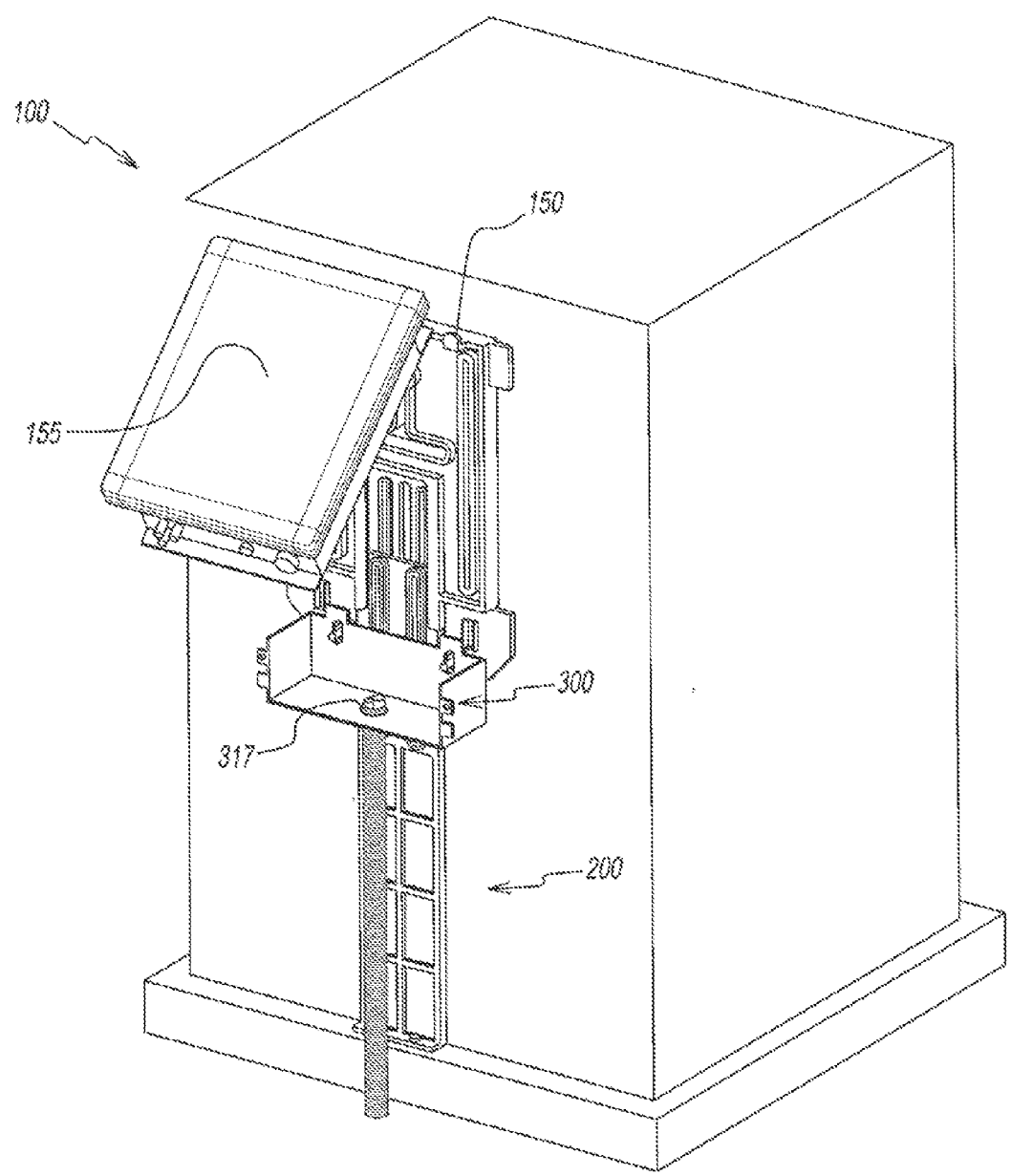
FIG. 16 is a perspective view of the support member, bracket and connection box of FIG. 14 mounted to a pad-type transformer, with equipment connected thereto.

As shown in FIG. 16, once connection box 300 is secured to bracket 100, a user can connect equipment to tabs 150 as described above. Furthermore, floor opening 317 may allow devices to enter and exit connection box 300, such as wires, cables, conduits or other similar devices. These devices may connect to the equipment that is connected to bracket 100 by the user.

Figure 17:
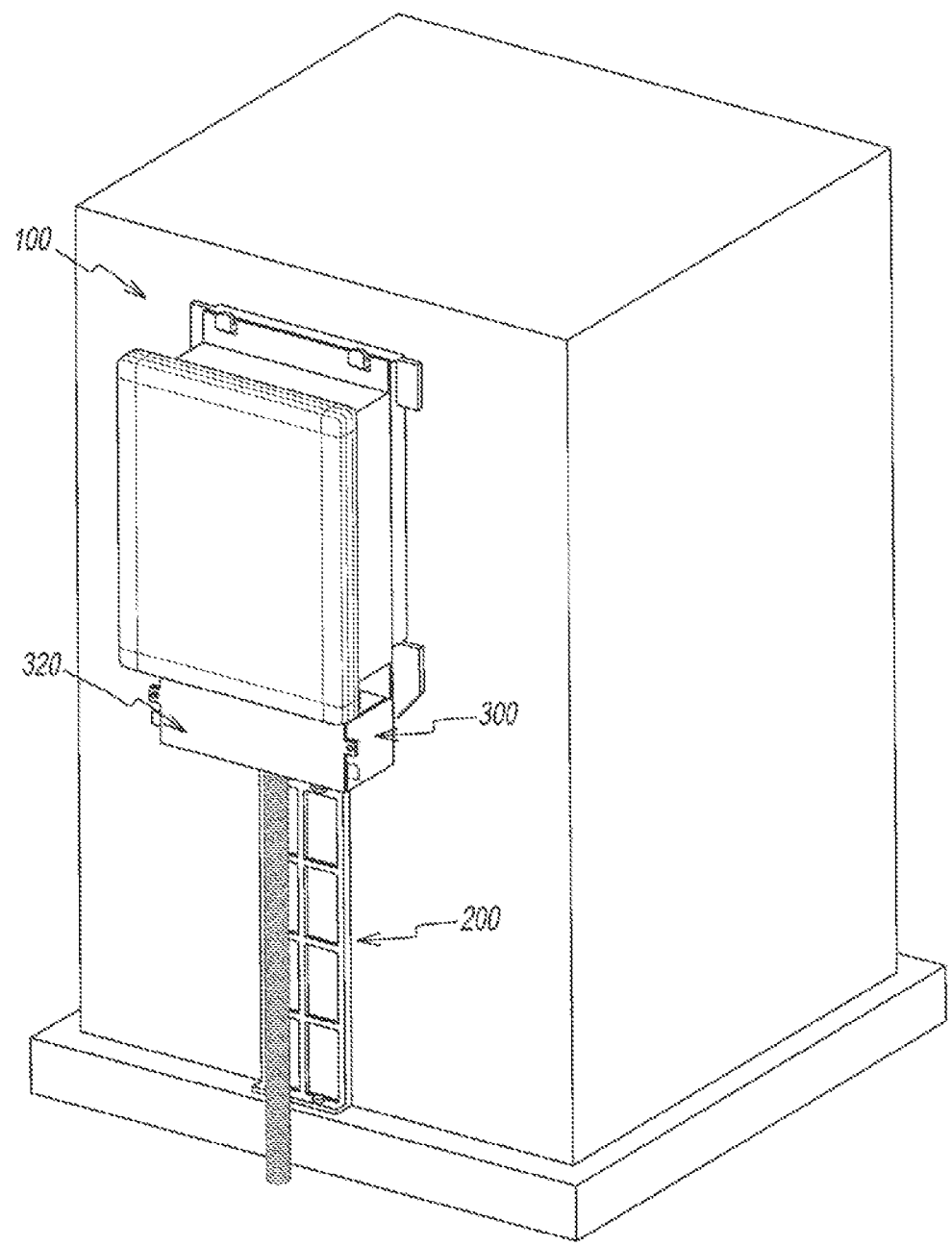
FIG. 17 is a perspective view of the support member, bracket and connection box of FIG. 14 mounted to a pad-type transformer, with equipment connected thereto.

Once the equipment is connected by the user, a cover 320 may be connected to connection box 300 by sliding on or use of a fastener, as shown in FIG. 17. Preferably, cover 320 has a locking means, such as a pad lock, or other similar lock, to prevent an unauthorized person from removing cover 320. As shown in FIG. 14A, connection box 300 may have connection box flanges with box locking holes 311 therethrough and cover 320 may have cover flanges with cover locking holes 313 therethrough. Box locking holes 311 align with cover locking holes 313 to receive a pad lock. Thus, any connections to equipment maintained in connection box 300 are protected.

Connection box 300, bracket 100, and/or support member 200 may remain in place while equipment is installed and/or removed. For example, equipment 155 can be disconnected from bracket 100 for maintenance by removal of retaining means 134 from securing fasteners 132 and movement of a bottom portion of equipment 155 away from bracket 100 to remove securing fasteners 132 from openings and/or recesses through equipment 155 corresponding to securing fasteners 132. Openings and/or recesses through equipment 155 corresponding to tab 150 are moved over tabs 150 to remove tabs 150 from the openings and/or recesses through equipment 155 corresponding to tab 150 freeing equipment 155 from bracket 100. Equipment 155 can then be connected as described herein to bracket upon completion of the maintenance while bracket 100 remains in place on surface 140. Tabs 150 facilitate installation, for example, in contrast to nuts and bolts, and routine maintenance which saves time and cost which is significant in the installation and routine maintenance processes.

FIG. 18 shows a rear view of bracket 100 with equipment being connected thereto. Electronic equipment, such as a grid node, connected to bracket 100 often has a number of fasteners, such as screws or bolts, which should not be accessed by an unauthorized person. These fasteners can secure various components of the equipment together, such as a cover to the equipment. As shown in FIG. 18, flanges 175 can be strategically located on bracket 100 to block openings where fasteners are inserted into the equipment, such as channels or slots. Thus, flanges 175 block the access of a screwdriver or other tool from entering areas having fasteners, when equipment is fully connected to bracket 100.

Figure 19:
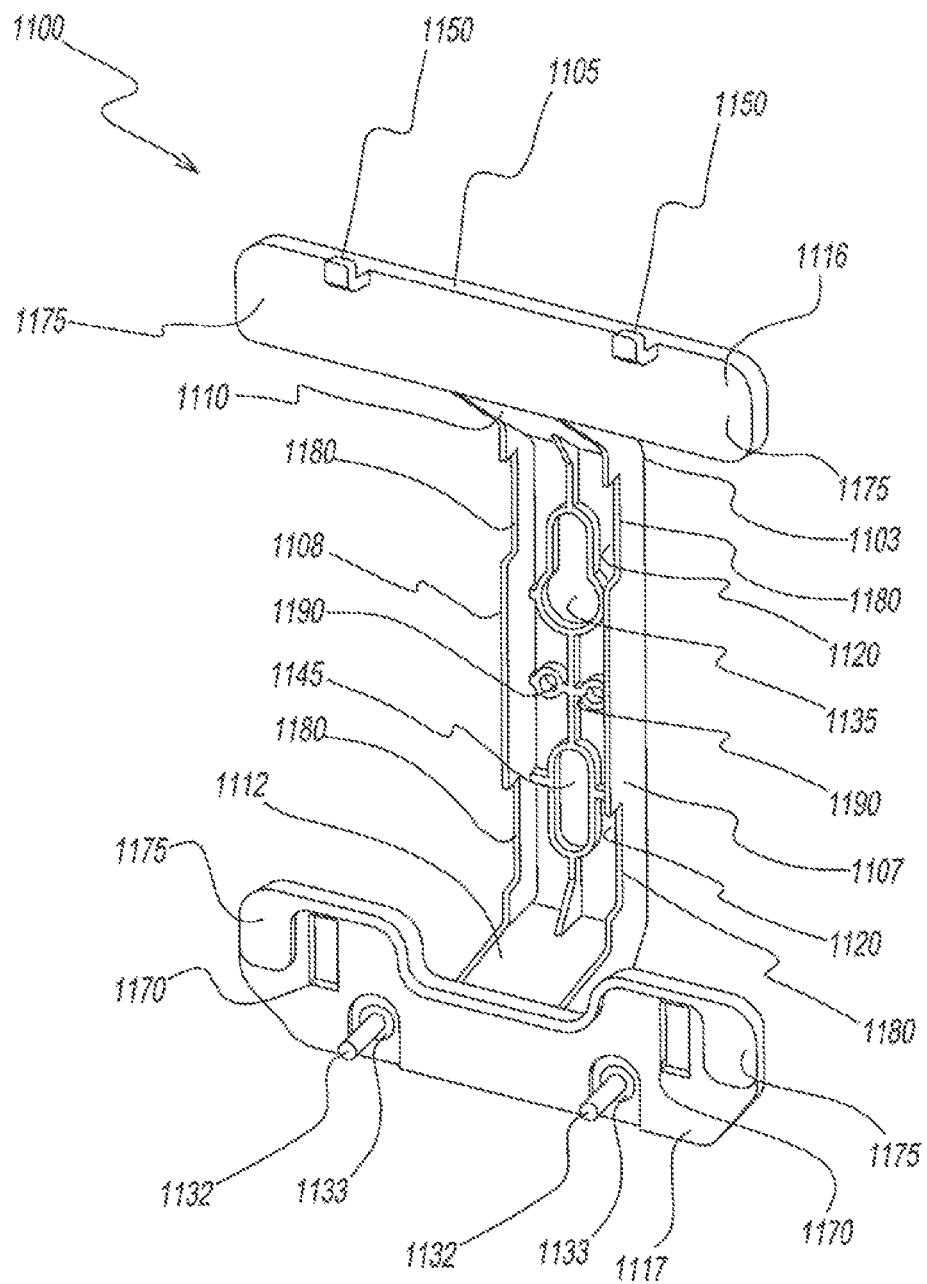
FIG. 19 is a front perspective view of an exemplary embodiment of a bracket of the present disclosure.

Referring to FIG. 19, another exemplary embodiment of a bracket of the present disclosure is shown and generally referred to by reference numeral 1100. Bracket 1100 has a U-shaped profile. Namely, bracket 1110 has a top portion 1116 and a bottom portion 1117 that are virtually parallel to each other when viewed in profile, and a middle body portion 1103 therebetween that is not aligned with the top and bottom portions to provide the U-shaped profile. Middle body portion 1103 has a front side surface 1103a and a rear side surface (not shown). The rear side surface is shaped to contact a mounting surface. Middle body portion 1103 has at least one mounting aperture 1135 similar to mounting aperture 135, and a mounting slot 1145 similar to mounting slot 145. Middle body portion 1103 has additional apertures 1190 that allow additional fasteners to connect to the equipment or additional fasteners to connect bracket 1100 to surface 140. Middle body portion 1103 has a pair of sidewalls 1107 and 1108. Pair of sidewalls 1107 and 1108 each has slots 1180.

Middle body portion 1103 is directly connected to extension portions 1110 and 1112 on opposite ends of the middle body portion that, in turn, are directly connected to top portion 1116 and bottom portion 1117, respectively. Extension portions 1110 and 1112 are connected to middle body portion 1103 at an angle of less than 180 degrees to protrude away from the mounting surface. Extension portion 1110 is connected to a top portion 1116 and extension portion 1112 is connected to a bottom portion 1117 forming an "I" shape.

Top portion 1116 has flanges 1175 that is similar to flanges 175 and tabs 1150 that are similar to tabs 150. Bottom portion 1117 has securing fasteners 1132 similar to securing fasteners 132 and mating fasteners 1133 similar to mating fasteners 133. Bottom portion 1117 has flanges 1175 similar to flanges 175 and connection box apertures 1170 similar to connection box apertures 170.

Figure 20:
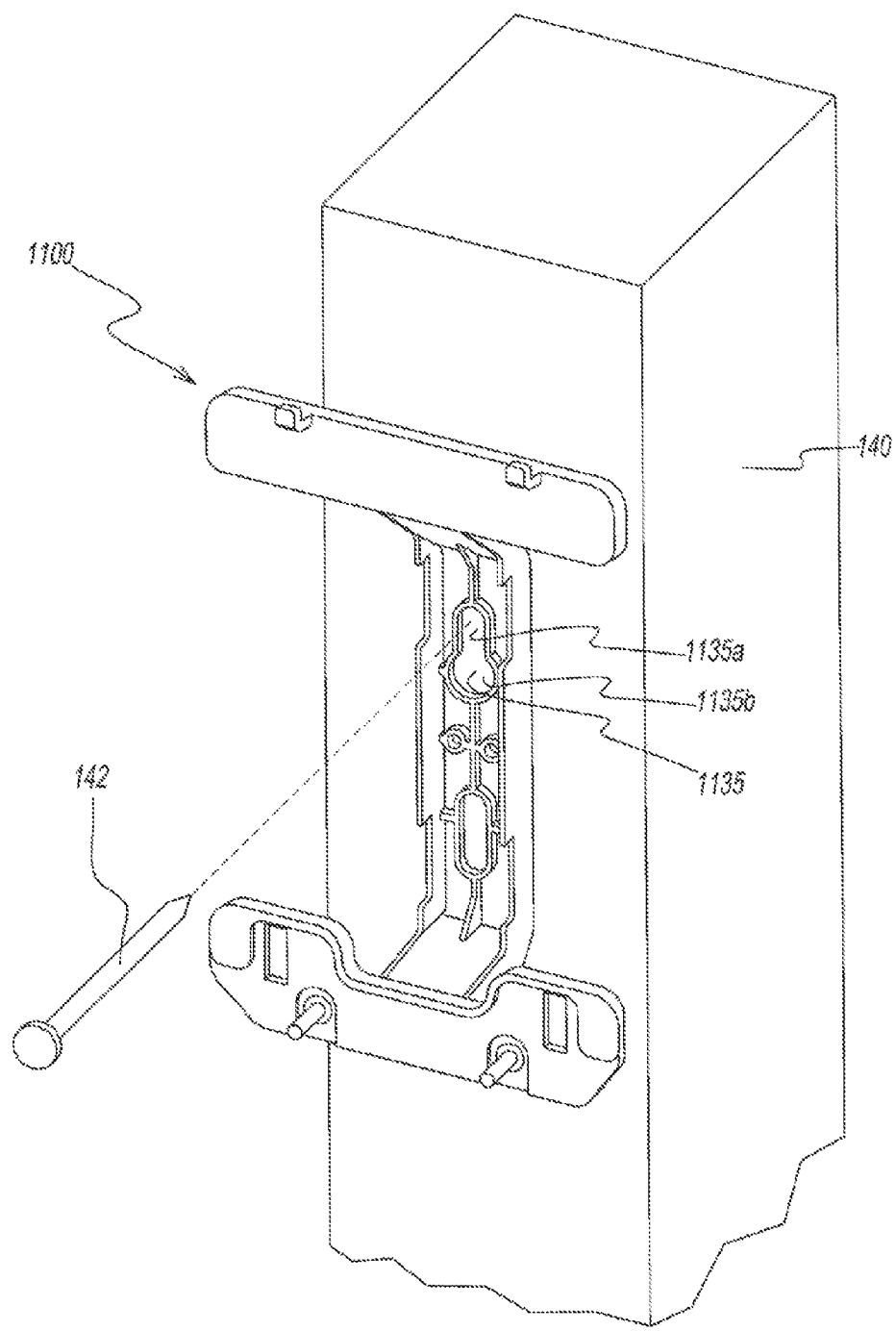
FIG. 20 is a perspective view of the bracket FIG. 19 being mounted onto a surface, such as a telephone/utility pole.

Referring to FIG. 20, bracket 1100 is placed against surface 140, for example, a telephone or a utility pole. Mounting fastener 142 is positioned in a portion of mounting aperture 1135 that is a narrower portion 1135a than a wider portion 1135b of mounting aperture 1135 and inserted into surface 140 to secure bracket 1100 to surface 140. Similar to mounting aperture 135, mounting aperture 1135 allows the user to adjust the height of bracket 1100 to achieve a proper vertical position on surface 140 before fully inserting mounting fastener 142 into surface 140.

Figure 21:
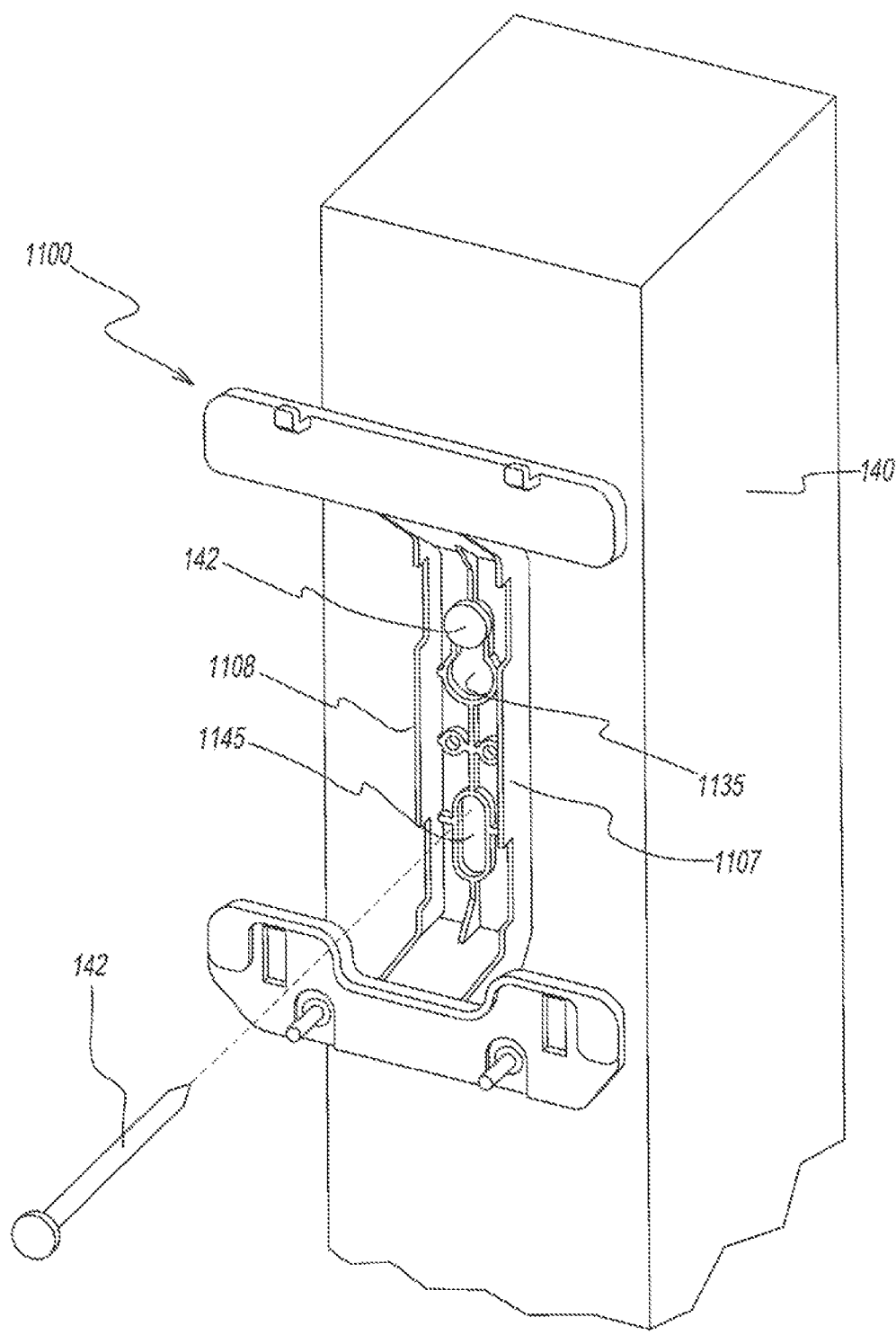
FIG. 21 is another perspective view of the bracket of FIG. 19 being mounted onto a surface.

Referring to FIG. 21, similar to mounting slot 145, bracket 1100 has mounting slot 1145 to receive additional mounting fasteners. The user inserts mounting fastener 142 into mounting slot 1145 to secure bracket 1100 to surface 140, as needed. Mounting fastener 142 can be any fastener described herein. Mounting slot 1145 allows the user to adjust mounting fastener 142 in the mounting slot before fully securing the mounting fastener to surface 140. This allows bracket 110 to be secured in a properly aligned position.

Figure 22:
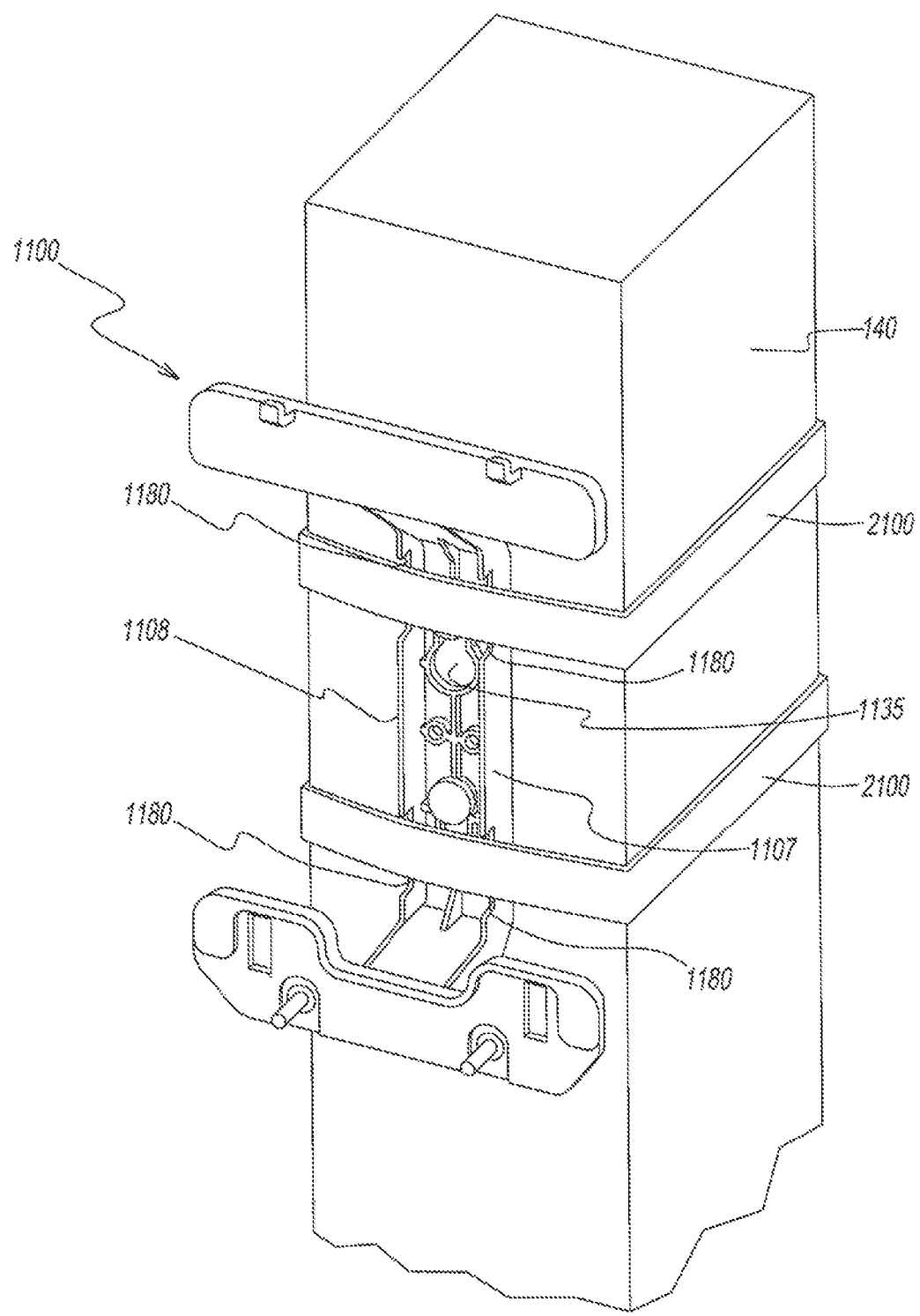
FIG. 22 is another perspective view of the bracket of FIG. 19 being mounted onto a surface.

Referring to FIG. 22, bracket 1100 may be connected to surface 140 by straps 2100 as an alternative, or in addition to, mounting fasteners 142. Each of straps 2100 wraps around bracket 1100 and surface 140, for example, around a utility pole, so that bracket 1100 is between straps 2100 and surface 140. Each of straps 2100 is positioned in a pair of slots 1180, one of the slots 1180 is in sidewall 1107 and one of the slots 1180 is in sidewall 1108, to maintain each of straps 2100 in a predetermined position relative to bracket 1100. Straps 2100 may be continuous or have ends that connect, for example, by mechanical fastener, such as staples, or adhesive. One or more straps 1800 may be used, for example, two straps are shown in FIG. 22. Straps 2100 may be plastic, rubber, metal or fabric. Straps 2100 that are metal may be discontinuous having two end portions and may be fastened to surface 140, for example, riveting, crimping, or coupling the two end portions together, or a ratchet strap connects the two end portions. Straps 2100 connect bracket 1100 to surface 140, for example, a metal pole, that does not easily allow fasteners, such as nails, to penetrate the surface.

Figure 23:
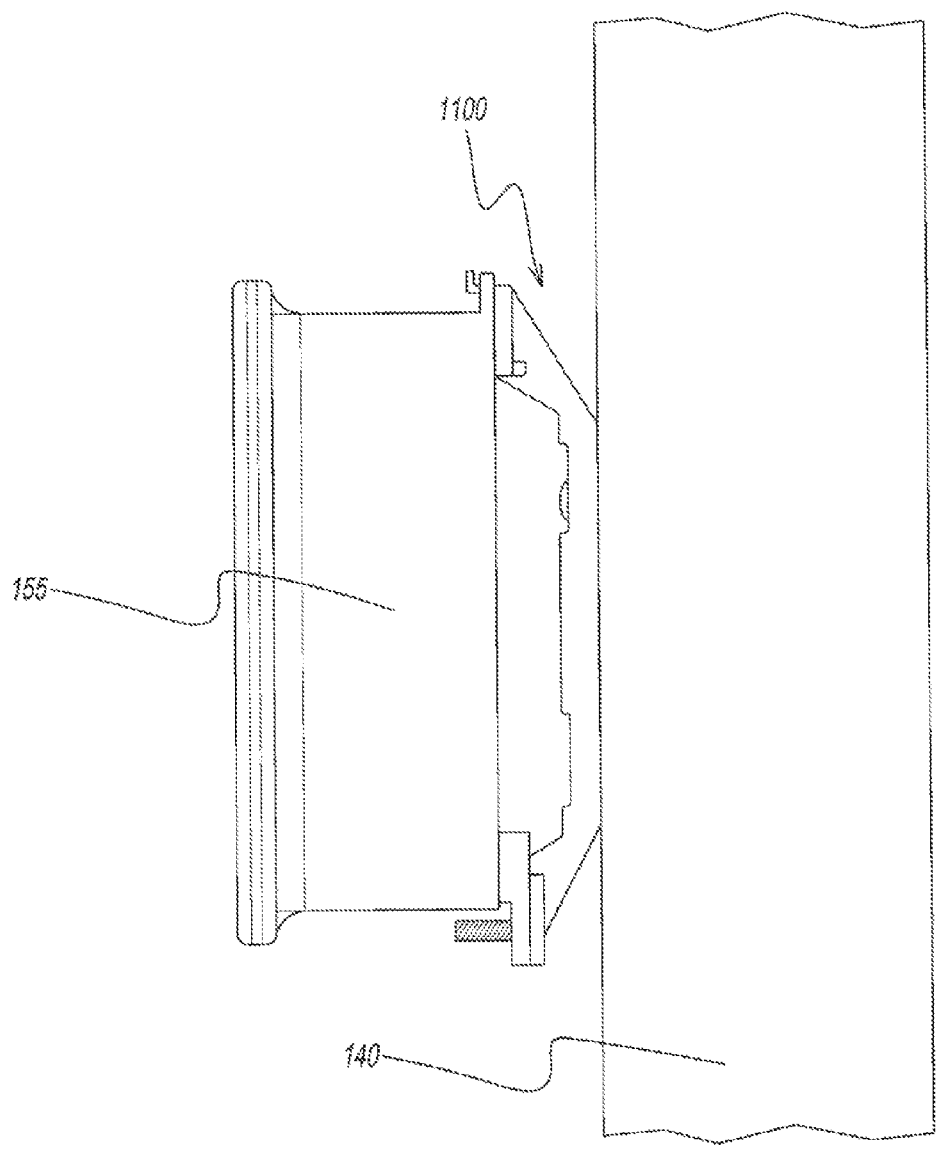
FIG. 23 is a perspective view of the bracket of FIG. 19 mounted with equipment connected to the bracket.

The equipment that a user connects to bracket 1100 should have openings and/or recesses corresponding to tab 1150 and/or securing fasteners 1132, that may be protruding from bracket 1100. The openings and/or recesses of equipment, such as equipment 155, are lined up with tabs 1150 and securing fasteners 1132. Once properly connected, a retaining means, such as nuts or clip pins are placed on securing fasteners 1132 to connect equipment 155 to bracket 1100, as shown in FIG. 23.

In another exemplary embodiment, a user may connect a security feature prior to connecting equipment to bracket 1100, such as a connection box 300. Back 305 of connection box 300 may have at least one connection box tab 307 that corresponds with connection box apertures 1170 on bracket 1100. Preferably, back 305 has a pair of connection box tabs 307. To connect connection box 300 to bracket 1100, connection box 300 is aligned at about a 45 degree angle to bracket 1100 and connection box tabs 307 are secured to connection box apertures 1170. Connection box 300 is secured by positioning connection box tabs 307 behind connection box apertures 1170. Back 305 of connection box 300 is then lowered to sit parallel to bracket 1100. Once connection box 300 is secured to bracket 1100, a user can connect equipment to tabs 1150 as described above. Furthermore, floor opening 317 may allow devices to enter and exit connection box 300, such as wires, cables, conduits or other similar devices. These devices may connect to the equipment that is connected to bracket 1100 by the user.

Once the equipment is connected by the user, a cover 320 may be connected to connection box 300 by sliding on or use of a fastener. Cover 320 may have a locking means, such as a pad lock, or other similar lock, to prevent an unauthorized person from removing cover 320. Thus, any connections to equipment maintained in connection box 300 are protected.

Electronic equipment, such as a grid node, connected to bracket 1100 often has a number of fasteners, such as screws or bolts, which should not be accessed by an unauthorized person. These fasteners can secure various components of the equipment together, such as a cover to the equipment. Flanges 1175 can be strategically located on bracket 1100 to block openings where fasteners are inserted into the equipment, such as channels or slots. Thus, flanges 1175 block the access of a screwdriver or other tool from entering areas having fasteners, when equipment is fully connected to bracket 1100.

Referring to FIG. 24, an exemplary embodiment of a top adapter that is used with brackets 100, 1100 of the present disclosure is shown and generally referred to by reference numeral 2400. Top adapter 2400 has tab slots 2405 and top fastening holes 2410.

Figure 25:
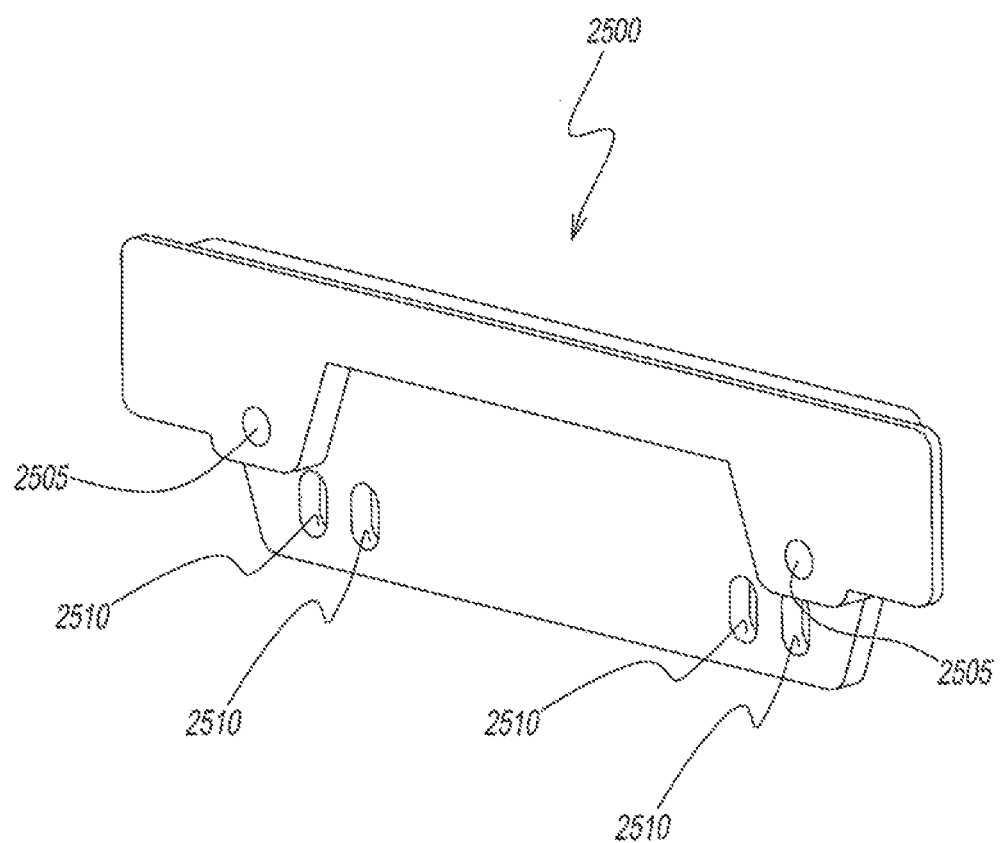
FIG. 25 is a perspective view of a bottom adapter connectable to the bracket of FIG. 1 and the bracket of FIG. 19.

Referring to FIG. 25, an exemplary embodiment of a bottom adapter that is used with brackets 100, 1100 of the present disclosure is shown and generally referred to by reference numeral 2500. Bottom adapter 2500 has bottom fastening holes 2505 and bracket fastening slots 2510.

Referring to FIG. 26, equipment 2605 is shown. Equipment 2605 has a top portion 2605a and a bottom portion 2605b. Equipment 2605 has threaded fasteners (not shown) embedded in top portion 2605a and bottom portion 2605b. Equipment 2605 does not include a connecting mechanism to connect to bracket 100 or bracket 1100. Top fastening holes 2410 of top adapter 2400 align with the threaded fasteners on top portion 2605a of equipment 2605. Bottom fastening holes 2505 of bottom adapter 2500 align with the threaded fasteners on bottom portion 2605b of equipment 2605. Top fasteners 2610 are inserted through both top fastening holes 2410 and the threaded fasteners to connect top adapter 2400 to equipment 2605. Bottom fasteners 2615 are inserted through both bottom fastening holes 2505 and the threaded fasteners to connect bottom adapter 2500 to equipment 2605. Top fasteners 2610 and bottom fasteners 2615, for example, are screws that connect to the threaded fasteners of equipment 2605.

Figure 27:
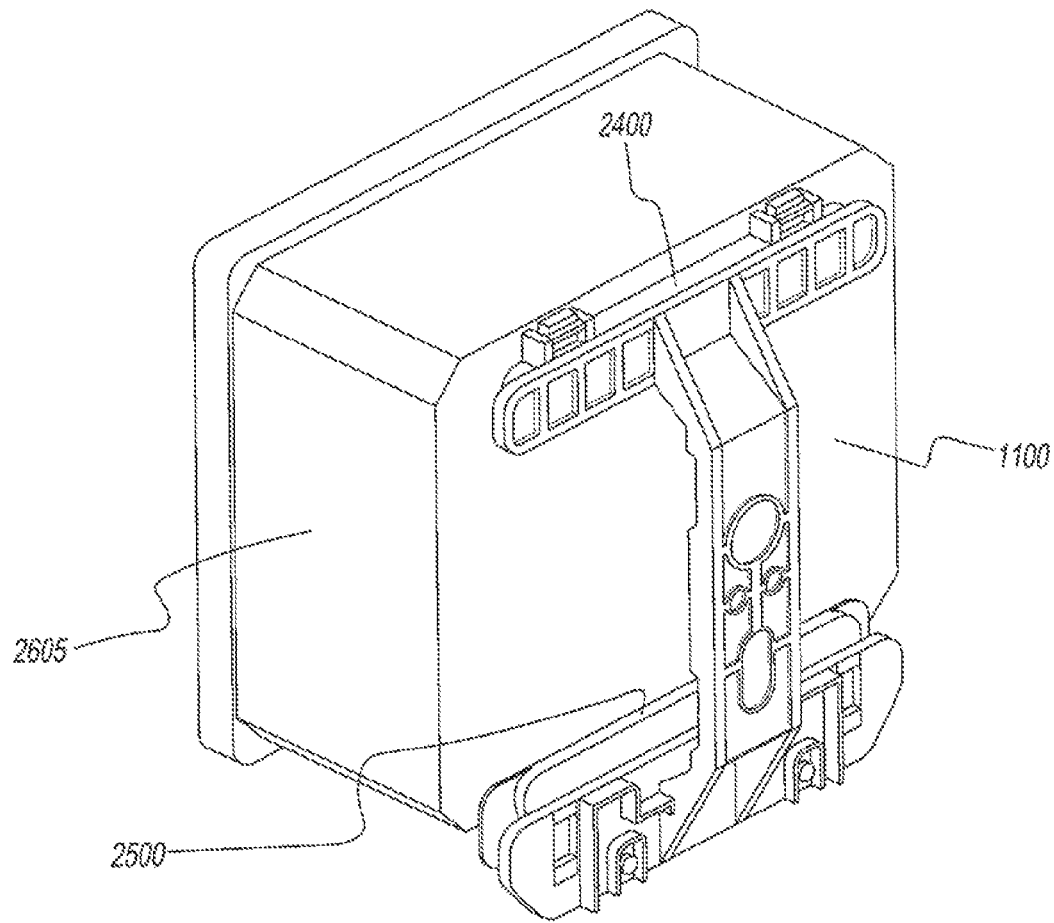
FIG. 27 is perspective view of the top adapter of FIG. 24 and the bottom adapter of FIG. 25 connected to the equipment and the bracket of FIG. 19.

Referring to FIG. 27, top adapter 2400 and bottom adapter 2500 are connected to equipment 2605 and bracket 1100. Top adapter 2400 connects equipment 2605 to bracket 1100 by inserting tabs 1150 of bracket 1100 into tab slots 2405. Bottom adapter 2500 connects equipment 2605 to bracket 1100 by inserting securing fasteners 1132 of bracket 1100 through fastening slots 2510. Mating fasteners 1133 are connected to securing fasteners 1132 so that bottom adapter 2500 is between bracket 1100 and mating fasteners 1133 securing adapter 2500 to bracket 1100. Bracket 1100, having equipment 2605 that is connected to bracket 1100 by top adapter 2400 and bottom adapter 2500, connects to surface 140 as described herein.

Top adapter 2400 can similarly connect equipment 2605 to bracket 100 by inserting tabs 150 of bracket 100 into tab slots 2405. Bottom adapter 2500 can similarly connect equipment 2605 to bracket 100 by inserting securing fasteners 132 of bracket 100 through fastening slots 2510 to connect equipment 2605 to bracket 100. Mating fasteners 133 are connected to securing fasteners 132 so that bottom adapter 2500 is between bracket 100 and mating fasteners 133 securing adapter 2500 to bracket 100. Bracket 100, having equipment 2605 that is connected to bracket 100 by top adapter 2400 and bottom adapter 2500, connects to surface 140 as described herein.

Top adapter 2400 and bottom adapter 2500 may be connected to bracket 100 or bracket 1100 prior to connecting to equipment 2605. Top adapter 2400 and bottom adapter 2500 may be one integral piece. Top adapter 2400 and bottom adapter 2500 can be made of any durable material such as, metal, plastic, or wood or other similar material. Top adapter 2400 and bottom adapter 2500, for example, are made of a polymer material, such as polycarbonate.

When used in the application, the term "about" means plus or minus up to ten percent of the recited number.

What is claimed is:

1. A bracket system comprising:
a bracket having a front side surface and a rear side surface opposite said front side surface, said rear side being shaped to be placed against a first mounting surface, said bracket having a mounting aperture that receives a mounting fastener to secure said bracket to said first mounting surface, said bracket having a securing fastener to connect a piece of equipment to said front side surface when said bracket is mounted to said first mounting surface, said bracket being connectable in a first configuration to a securing member, said securing member being slidably connected to said bracket to connect to a second mounting surface to position said bracket properly on a transformer, said bracket being connectable in a second configuration to said first mounting surface to connect said piece of equipment without said securing member, wherein
said securing fastener has a portion protruding from said front side surface that aligns with an opening through said equipment so that a nut or a clip is placed on said securing fastener to connection said piece of equipment to said bracket, and
said support member has a top end, a bottom end opposite said top end and a pair of sides, wherein said support member has a bottom segment at said bottom end that is connected to an arm segment, wherein said arm segment has a plurality of grooves separating said arm segment into a plurality of sections, and wherein said support member has a length that is adjustable by breaking off one or more of said plurality of sections at one or more of said plurality of grooves.

2. The bracket system of claim 1, wherein said bracket has a tab on a top portion thereof that aligns with a tab hole through said equipment, and wherein said tab passes through said tab hole whereby said equipment hangs on said tab so that said equipment can be secured to said bracket.

3. The bracket system of claim 2, wherein said bracket has said securing fastener on a bottom portion thereof that aligns with a fastener hole through said equipment, and wherein said securing fastener passes through said fastener hole and a mating fastener so that said equipment can be secured to said bracket.

4. The bracket system of claim 1, wherein said first mounting surface is perpendicular to said second mounting surface.

5. The bracket system of claim 1, wherein said mounting aperture is a keyhole shape.

6. The bracket system of claim 1, further comprising a mounting slot through said bracket having a shape so that said bracket is adjustable in said mounting slot before fully securing said bracket to said first mounting surface via a second mounting fastener.

7. The bracket system of claim 1, wherein said arm segment has a pair of oppositely disposed ribs that act as a guide when said support member is connected to said bracket, and wherein each of said pair of oppositely disposed ribs is on one of said pair of sides of said support member.

8. The bracket system of claim 7, wherein once said support member is engaged with said bracket, a plurality of arm fasteners are inserted through a plurality of support slots through said bracket and through a plurality of arm slots through said support member so that said support member is secured to said bracket by placing a securing device on each of said plurality arm fasteners.

9. The bracket system of claim 8, wherein said plurality of arm fasteners are tightened so that said support member is slidable relative to said bracket to adjust a height of said support member extending from said bracket.

10. The bracket system of claim 9, wherein said bottom segment has a bottom segment body and a foot that protrudes from said bottom segment body, and wherein said securing devices are tightened to lock said support member in place on said bracket when said bracket is mounted to said first mounting surface and said support member is adjusted until said foot contacts said second mounting surface.

* * * * *

UNITED STATES PATENT AND TRADEMARK OFFICE
CERTIFICATE OF CORRECTION

PATENT NO. : 9,217,534 B2  
APPLICATION NO. : 13/820339  
DATED : December 22, 2015  
INVENTOR(S) : Merck et al.

Page 1 of 1

It is certified that error appears in the above-identified patent and that said Letters Patent is hereby corrected as shown below:

In the Drawings

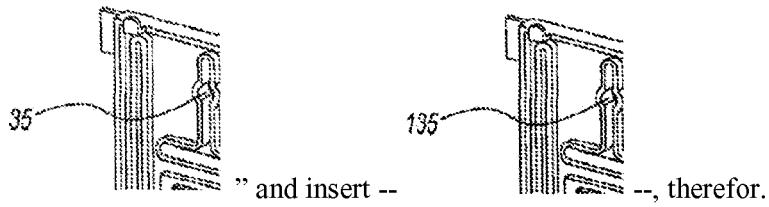

In Fig. 11, Sheet 11 of 28, delete " " and insert -- --, therefor.

In the Specification

In Column 2, Line 26, delete "in an" and insert -- in a --, therefor.

In Column 2, Line 30, delete "an" and insert -- is an --, therefor.

In Column 2, Line 57, delete "is" and insert -- is a --, therefor.

In Column 2, Line 59, delete "is" and insert -- is a --, therefor.

In Column 5, Line 41, delete "end 110" and insert -- end 205 --, therefor.

In Column 5, Lines 46-47, delete "surface 125" and insert -- surface 214 --, therefor.

In Column 7, Line 27, delete "bracket 1110" and insert -- bracket 1100 --, therefor.

In Column 8, Line 8, delete "bracket 110" and insert -- bracket 1100 --, therefor.

Signed and Sealed this  
Seventh Day of June, 2016

Michelle K. Lee  
*Director of the United States Patent and Trademark Office*